United States Patent [19]
Vulk, Jr.

[11] Patent Number: 5,892,499
[45] Date of Patent: Apr. 6, 1999

[54] FOREARM SUPPORT FOR COMPUTER INTERFACE DEVICE

[76] Inventor: Joseph Patrick Vulk, Jr., 2140 Teal Ct., Lewisville, Tex. 75067

[21] Appl. No.: 704,485

[22] Filed: Aug. 17, 1996

[51] Int. Cl.⁶ .............................. B68G 5/00; H03K 17/94; G09G 5/00; G09G 5/08
[52] U.S. Cl. .................... 345/156; 248/118; 248/346.01; 341/22; 345/157; 345/167; 345/168
[58] Field of Search .................................... 345/168, 156, 345/163; 248/917, 918, 118.1, 118.3, 118.5, 118; 361/680; 341/22, 21; D14/115, 114; 297/115; 400/478, 489, 492, 486, 682; 235/145 R, 146

[56] References Cited

U.S. PATENT DOCUMENTS

| | | |
|---|---|---|
| D. 373,999 | 9/1996 | Staats ..................................... D14/114 |
| 2,325,414 | 7/1943 | McChesney . |
| 2,614,155 | 10/1952 | Lippy . |
| 2,626,163 | 1/1953 | Scantlebury . |
| 2,694,026 | 11/1954 | Johnson . |
| 2,720,660 | 10/1955 | Smith . |
| 2,950,890 | 8/1960 | Hough, Jr. . |
| 3,062,609 | 11/1962 | Abel . |
| 3,099,774 | 7/1963 | Crane . |
| 3,268,766 | 8/1966 | Amos . |
| 3,300,250 | 1/1967 | Dollgener . |
| 3,362,666 | 1/1968 | O'Donnell . |
| 4,005,840 | 2/1977 | Ratkovich . |
| 4,066,171 | 1/1978 | Fowlle . |
| 4,194,254 | 3/1980 | Torrez . |
| 4,313,112 | 1/1982 | Foster . |
| 4,481,556 | 11/1984 | Berke . |
| 4,482,063 | 11/1984 | Berke et al. . |
| 4,482,064 | 11/1984 | Berke et al. . |
| 4,483,572 | 11/1984 | Story . |
| 4,483,634 | 11/1984 | Frey et al. . |
| 4,511,111 | 4/1985 | Godfrey et al. . |
| 4,545,554 | 10/1985 | Latino . |
| 4,592,528 | 6/1986 | Still . |
| 4,610,054 | 9/1986 | Malian . |
| 4,619,427 | 10/1986 | Leymann . |
| 4,621,781 | 11/1986 | Springer . |
| 4,674,790 | 6/1987 | Johnson . |
| 4,688,862 | 8/1987 | Fowler et al. . |
| 4,709,972 | 12/1987 | LaBudde . |
| 4,726,085 | 2/1988 | Antonio . |
| 4,770,466 | 9/1988 | Pesterfield . |
| 4,776,284 | 10/1988 | McIntosh . |
| 4,779,922 | 10/1988 | Cooper . |
| 4,786,103 | 11/1988 | Selbert . |

(List continued on next page.)

*Primary Examiner*—Jeffery Brier
*Assistant Examiner*—David L. Lewis
*Attorney, Agent, or Firm*—Crutsinger & Booth

[57] ABSTRACT

An ergonomic palm and forearm support device is provided for computer interface controls. The device supports the palm and the forearm of a user's hand and arm during the user's operation of a cursor control, keyboard, or other computer interface. The device has a base, a raised palm support portion between a forward end and a rearward end of the base, a forearm support portion that is inclined from the rearward end of the base toward the raised palm support portion, whereby, when the user's palm and forearm are placed on the device, an angle of greater than or equal to 180 degrees is created between the top of the user's hand and the top of the user's forearm. For a cursor control interface, the device has a cursor position control surface portion that is declined from the raised palm support portion toward the forward end of the base. For a keyboard interface, the device has a keyboard interface surface portion that is declined from the raised palm support portion toward the forward end of the base. Preferably, the cursor position control surface portion of the keyboard interface surface portion has a generally convex surface contour when observed from above, whereby the user's hand can rest on the device in a more natural prehensile position, and the interface can be operated with more natural grasping motions of the hand and fingers.

28 Claims, 31 Drawing Sheets

U.S. PATENT DOCUMENTS

| | | |
|---|---|---|
| 4,822,103 | 4/1989 | Stenval . |
| 4,907,835 | 3/1990 | Salters . |
| 4,913,390 | 4/1990 | Berke . |
| 4,938,439 | 7/1990 | Fried et al. . |
| 4,973,176 | 11/1990 | Dietrich . |
| 4,976,407 | 12/1990 | Schwartz et al. . |
| 4,989,819 | 2/1991 | Sigler . |
| 5,029,260 | 7/1991 | Rollason . |
| 5,029,350 | 7/1991 | Edelson . |
| 5,040,757 | 8/1991 | Benaway . |
| 5,042,761 | 8/1991 | McBride . |
| 5,048,784 | 9/1991 | Schwartz et al. . |
| 5,050,826 | 9/1991 | Hubbard . |
| 5,056,743 | 10/1991 | Zwar et al. . |
| 5,067,834 | 11/1991 | Szmanda et al. ............... 400/489 |
| 5,074,413 | 12/1991 | Ikuta . |
| 5,088,668 | 2/1992 | Grimm . |
| 5,104,073 | 4/1992 | Van Beck . |
| 5,120,938 | 6/1992 | Rollason . |
| 5,131,614 | 7/1992 | Garcia . |
| 5,145,270 | 9/1992 | Darden . |
| 5,156,475 | 10/1992 | Zilberman . |
| 5,178,477 | 1/1993 | Gambaro ....................... 400/489 |
| 5,183,230 | 2/1993 | Walker et al. . |
| 5,228,655 | 7/1993 | Garcia . |
| 5,242,139 | 9/1993 | Aldrich . |
| 5,244,296 | 9/1993 | Jensen . |
| 5,270,709 | 12/1993 | Niksbacher ..................... 341/22 |
| 5,301,908 | 4/1994 | Reames ........................ 248/118 |
| 5,311,210 | 5/1994 | O'Brien et al. ................ 345/168 |
| 5,318,367 | 6/1994 | Braun et al. . |
| 5,326,056 | 7/1994 | Smith . |
| 5,336,001 | 8/1994 | Lichtenberg . |
| 5,339,097 | 8/1994 | Grant . |
| 5,340,067 | 8/1994 | Martin et al. ................ 248/118.5 |
| 5,342,005 | 8/1994 | Szmanda et al. ............... 248/118 |
| 5,351,066 | 9/1994 | Bucker et al. . |
| 5,360,280 | 11/1994 | Camacho et al. . |
| 5,372,441 | 12/1994 | Louis . |
| 5,379,973 | 1/1995 | Rader . |
| 5,383,632 | 1/1995 | Shirlin et al. . |
| 5,393,150 | 2/1995 | Fort . |
| 5,397,189 | 3/1995 | Minogue . |
| 5,398,896 | 3/1995 | Terbrack . |
| 5,402,972 | 4/1995 | Schmidt . |
| 5,405,204 | 4/1995 | Ambrose . |
| 5,410,333 | 4/1995 | Conway . |
| 5,411,341 | 5/1995 | Ullman ........................ 400/489 |
| 5,416,498 | 5/1995 | Grant . |
| 5,421,543 | 6/1995 | Hotaling . |
| 5,426,449 | 6/1995 | Danzinger . |
| 5,430,263 | 7/1995 | English et al. . |
| 5,432,510 | 7/1995 | Matthews . |
| 5,433,407 | 7/1995 | Rice . |
| 5,439,304 | 8/1995 | Phillips et al. . |
| 5,443,237 | 8/1995 | Stadtmauer et al. . |
| 5,444,462 | 8/1995 | Wambach . |
| 5,456,542 | 10/1995 | Welch et al. . |
| 5,463,925 | 11/1995 | Galocy ........................ 400/682 |
| 5,465,931 | 11/1995 | McDonald . |
| 5,473,325 | 12/1995 | McLincoln . |
| 5,479,192 | 12/1995 | Carroll . |
| 5,481,263 | 1/1996 | Man . |
| 5,486,058 | 1/1996 | Allen . |
| 5,490,647 | 2/1996 | Rice . |
| 5,490,710 | 2/1996 | Dearing et al. . |
| 5,492,291 | 2/1996 | Otami . |
| 5,492,298 | 2/1996 | Walker . |
| 5,502,460 | 3/1996 | Bowen . |
| 5,503,484 | 4/1996 | Louis . |
| 5,509,628 | 4/1996 | Noble . |
| 5,562,270 | 10/1996 | Montague . |
| 5,576,733 | 11/1996 | Lo ............................ 345/163 |
| 5,689,253 | 11/1997 | Hargreaves et al. ............. 341/22 |
| 5,765,790 | 6/1998 | Kuldvere ..................... 248/118 |

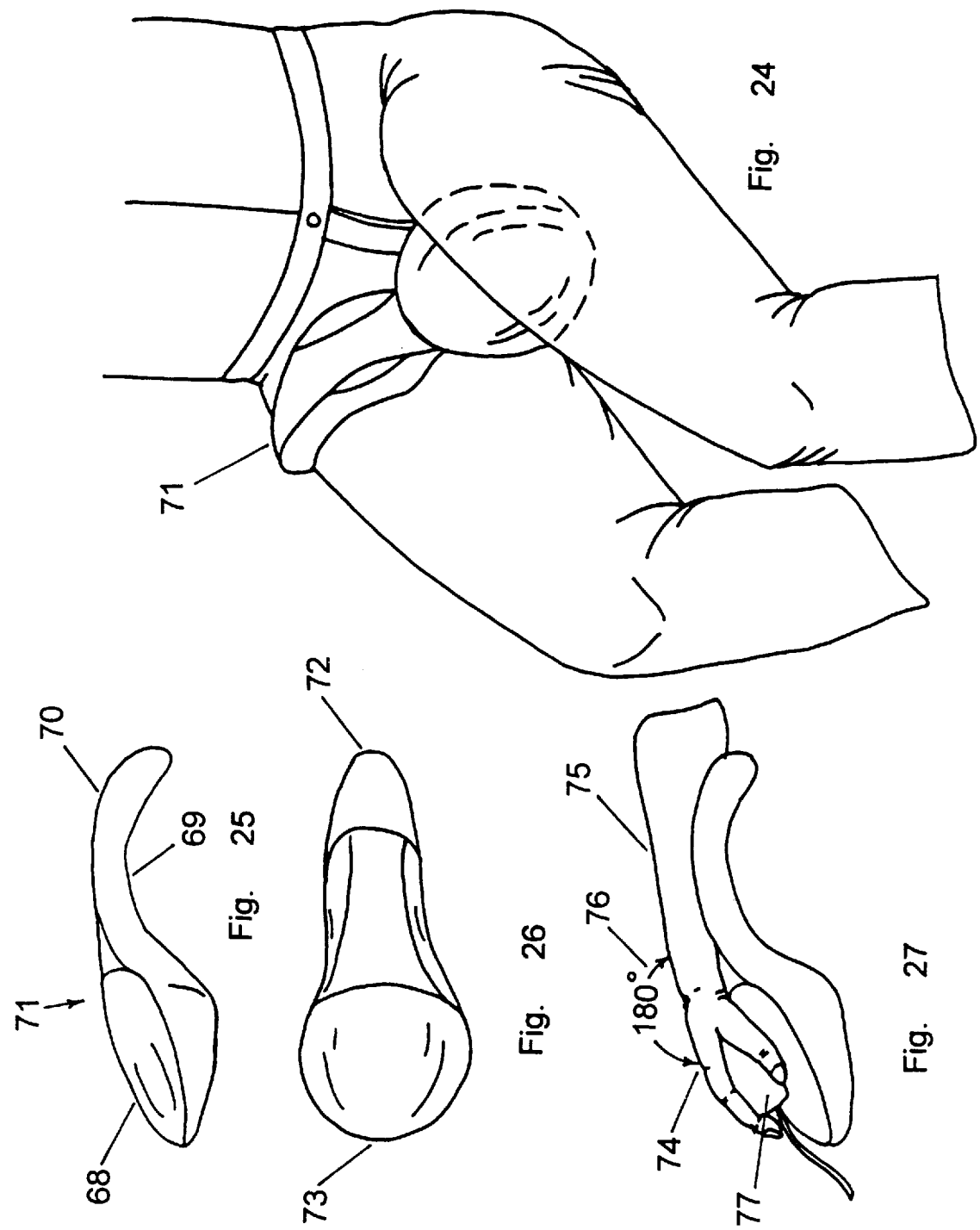

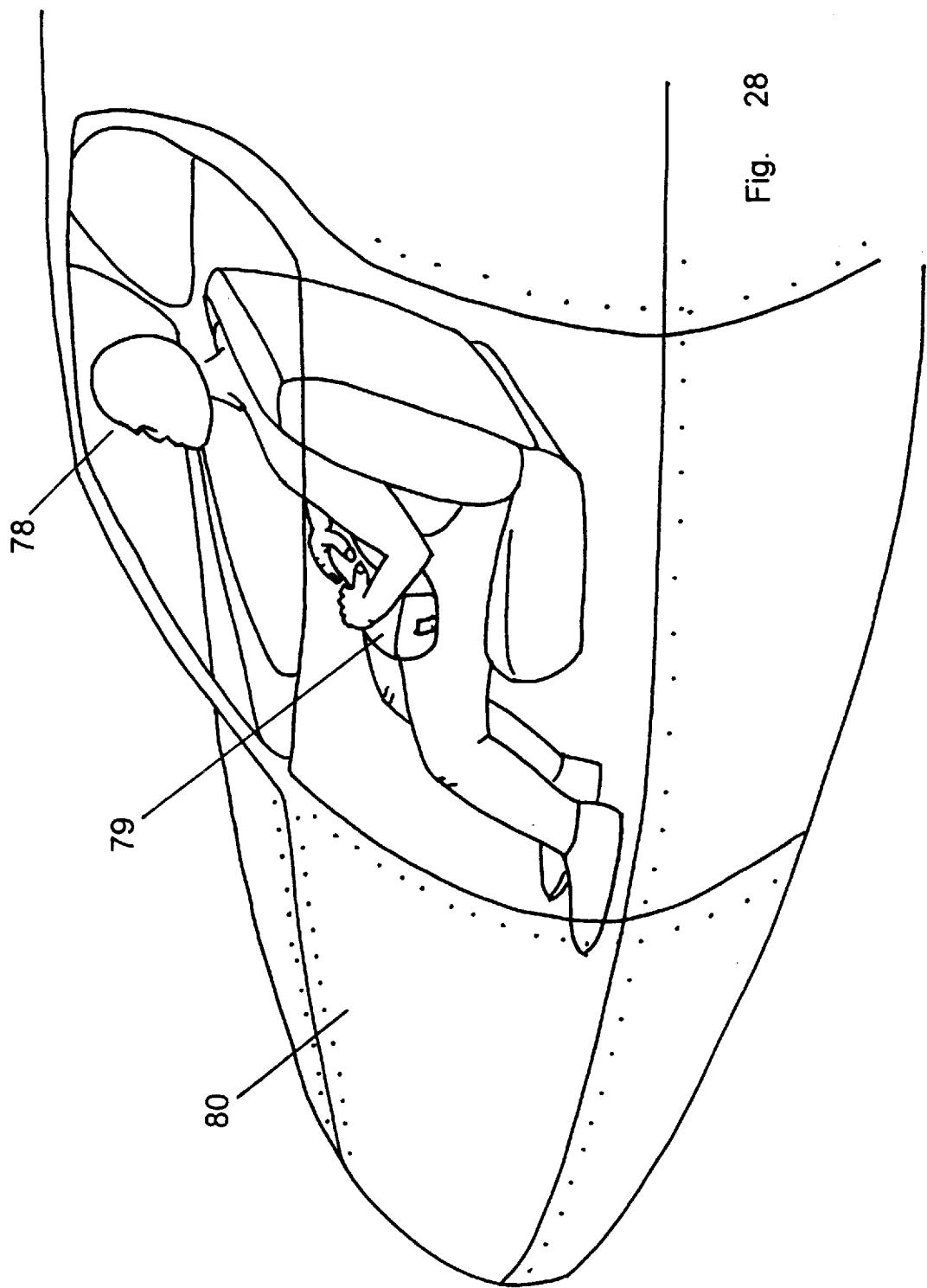

FOREARM SUPPORT FOR COMPUTER INTERFACE DEVICE

RELATED U.S. DECLARATION MATERIAL

Disclosure Document No. 394006 Feb. 12, 1996

Disclosure Document No. 394009 Feb. 12, 1996

Disclosure Document No. 394008 Feb. 12, 1996

TECHNICAL FIELD

This invention relates to the art of creating an ergonomic interface between an individual and his or her manually actuated data entry device(computer, teller machine or the like).

BACKGROUND

To prevent repetitive strain injuries and general discomfort associated with the use of computer keyboards and the like, attempts have been made to create ergonomic keyboards and associated hardware. There are many unusually shaped keyboards and cursor positioning devices such as the mouse. However, there is no device which adequately addresses the issue of Repetitive Strain Injury with a convenient and simple solution.

Carpal Tunnel Syndrome(CTS), a form of tendinitis within the arms and wrists of a user of keyboards, is caused when a person's job requires the person to use manually actuated devices for extended periods of time. Ligament friction and joint stress can cause temporary or permanent pain.

U.S. Pat. No. 5,426,449 reveals a keyboard which rotates the hands and supports them on their sides. This may help the underside of the wrist, but the same problems would develop on the side. Also, in this configuration, the entire weight of the arms would rest upon the side of the hands which would soon cause discomfort.

U.S. Pat. Nos. 5,416,498 and 5,339,097 issued to Grant show a keyboard having a "split-key" arrangement with the key face angled toward the user and having cursor control located for the thumb. When using Grant's keyboard the user's wrists and arms have no support, and to use the mouse with the user's thumb's, the user's wrists would incur a severe angle. This severe angle between the top of the forearm and the top of the hand would increase wrist stress even more.

U.S. Pat. No. 5,145,270 issued to Darden reveals a Reverse Slope Keyboard which has a raised rear portion and a wrist support at the top so that the user may strike the keys on a reversely sloping keyboard surface. Darden's keyboard represents the greatest improvement until now and yet does not solve the problem of user stress. Darden's keyboard does make the leap to a reverse slope, however the support is defined support as a wrist support. From the figures included in Darden's patent, one can see that the wrists are supported at the forearm hand junction, increasing pressure upon the Carpal Tunnel and thus inducing previously mentioned Carpal Tunnel Syndrome. Darden's keys are arranged in a stepwise fashion upon the reverse sloping face of the keyboard. The keys are large and must be struck vertically(to make clearance for fingernails). The important problem here is that if the user's hand is supported at the wrist, and the user's fingers must move in a perpendicular plane to that generated by the user's forearms, the user's fingers become very tired very quickly. Thus, when using Darden's keyboard, pain and discomfort would come rapidly and the problem that this art form attempts to address would remain.

U.S. Pat. Nos. 5,120,938 and 5,029,260 by Rollason reveal a keyboard designed to be used in the lap of the user. Rollason's keyboard, while convenient, does not address the issue of repetitive strain injury correctly. Rollason does not address the issue of wrist stress because the keys are facing the user which causes one's wrists to be bent backwards. And, while in the lap of the user, there is no support for the user's forearms unless the user's forearms rest on the user's chair arm rests. The user would encounter the difficulty of having a mis-match between the height of the arm-rest and the height of the user's elbows. Finally, this keyboard would be cumbersome and extremely uncomfortable if used on a table top. Also, while using Rollason's keyboard in one's lap, one would eventually drop one's wrists down and thus incur the strain associated with a severe angle between the hand and forearm.

None of these patents correctly understands and addresses the joint stress issue. To fully address the hand stress issue, one must do the following: Place one's hands in one's lap, palms facing up, and find the position which is the most comfortable. The position you probably have found is one where there is a slight angle between the top of your forearm and the top of your hand(slightly greater than 180 degrees). Also, one's hands are probably in the prehensile or grasping position, as though you would not have to move your fingers and thumb far to grab something. Now, while maintaining the same hand and forearm positions, roll the forearms over until the palms are facing down. This is the ideal position for the hands to operate in. And, none of the disclosed patents makes an attempt to put the hand and forearm into this position.

The following is a list of disadvantages within the current art of ergonomic interfaces:

1) Excessive pressure is placed upon the wrist and thumb joints. This pressure is applied by direct force from another object upon which the wrist is resting. Abnormal pressure is also created within the wrist and thumb joints when the angle between the top of the forearm and the top of the hand becomes less than 180 degrees.

2) Current attempts to address the joint stress problem support the wrists of the user, thereby aggravating the problem.

3) Existing patents have small radii on most edges which can jab into the user's hands and become uncomfortable after extended use.

4) Existing patents force the user to sit at the desk and work, causing back problems, and existing patents that utilize the lap-mounted position are cumbersome and cause an angle between the top of the forearm and the top of the hand which is less than 180 degrees.

5) Existing patents and hardware force the user to strike or push the keys of the keyboard. The striking motion or pushing motion of the keys is inherently unnatural for hands adapted to grasp, grip, or pull towards the palms of the hands.

6) Existing patents and hardware have large keys and are spaced far enough apart to require large finger movements to strike them.

7) Existing key arrangements do not lie in the path that the natural motion of the fingertips take as the fingers move away from the palm of the hand.

8) Existing keys, once struck, "bottom out" and stop abruptly sending shock waves reverberating through the joints of the finger striking the key.

9) Existing patents have keyboards made of hard plastic material which, over time, become uncomfortable.

10) Existing patents do not provide forearm support in a convenient manner(i.e. incorporated as part of the keyboard or ergonomic interface).
11) Existing patents require motion of the fingertips/hands that is inherently unnatural(i.e. pushing or striking motion as opposed to pulling motion).
12) Existing patents do not require the hands to be in a truly prehensile or grasping position.
13) Existing patent with reverse slope of keyboard face has keys arranged in a manner which requires awkward motion of the fingers(i.e. perpendicular to forearms).
14) Existing patent with reverse slope of keyboard face does not have keys arranged normal to reversely sloping plane.
15) Existing patents have keys arranged such that they are easily visible while in use. This discourages the keyboard user from memorizing the key positions and thus slows down the user's long term data entry speed.
16) Existing patents do not provide palm support in a convenient manner such that keys can easily be reached even while the palms of the hands are supported. Existing patents may support the palm, but to actuate keys etc., the angle between the top of the forearm and the top of the hand is forced to bend at an angle of less than 180 degrees.
17) Existing patents do not provide a convenient method of utilizing one's cursor position control in one's lap without creating an angle between the top of the forearm and the top of the hand which is less than 180 degrees.
18) Existing patents do not have integral thumb recesses.
19) Existing patents do not have grab handles for convenient movement of device.
20) Existing patents do not have convenient power cord storage space.
21) Existing patents do not provide a recessed area for the user's stomach(i.e. no belly space).
22) Existing lap mounted patents are not contoured for groin and scrotal area.
23) Existing patents do not incorporate a cursor control centrally located on reverse side of keyboard or centrally located on reverse side of cursor control pad.
24) Existing patents do not provide dual space bars centrally located in recessed thumb area.
25) Existing patents do not allow the fingers and thumbs to comfortably wrap around the keyboard surface in a grasping position.
26) Existing cursor control pads do not incorporate a convex declined shape on cursor control surface.

OBJECTS AND ADVANTAGES

Accordingly, the invention addresses the issues of Repetitive Strain Injury, and the general discomfort associated with the use of manually actuated data entry devices such as computer keyboards, cursor position control devices (mouse), and the like. The invention provides a convenient, practical, and simple solution which is easy to manufacture with existing technology and is also inexpensive. Several objects and advantages of the invention are:

1) To provide manually actuated ergonomic interfaces (E.I.'s) for humans which create minimal pressure upon the wrist and thumb joints by supporting either the palm of the hands, the forearms, or both. Further reduction of wrist and thumb joint pressure to be accomplished by creating an angle of greater than or equal to 180 degrees between the top of the forearms and the top of the hands of the user while using the E.I.'s.
2) To provide E.I.'s which do not support the wrists of the user directly thus inherently reducing stress(force per unit area) within the wrists.
3) To provide E.I.'s with all surfaces that may come in contact with the user having large radii that will not jab into the user and thus be more comfortable for extended periods of use.
4) To provide E.I.'s that can be used in a lap mounted position that does not force the user to sit immediately adjacent to his or her desk, which is not cumbersome and creates an angle of greater than or equal to 180 degrees between the top of the hands and the top of the forearms of the user, thus reducing back problems and/neck strain and other repetitive strain injuries(RSI).
5) To provide E.I.'s which do not force the user to strike or push the keys of the keyboard. Rather than push or strike the keys, an E.I. is provided that has keys that are pulled with the hands in a more natural grasping motion, thus adapting the E.I. to the naturally evolved prehensile position of the hands of the user.
6) To provide E.I.'s which have small keys that are spaced close enough together so as to require only minimal finger motion and force to actuate them.
7) To provide a key arrangement which places the keys in the path that natural finger motion follows as the fingers move toward or away from the palm of the hands.
8) To provide keys that will not "bottom out" abruptly, but will have sufficient cushioning once actuated such that minimal force is placed upon the finger joints at the completion of actuation; this will reduce forces within the finger joints and reduce wear and tear upon the fingers and their joints.
9) To provide E.I.'s which have surfaces that are made from "soft" surfaces that provide cushioning to all parts of the user which may come into contact with the E.I., thus increasing the comfort level of the user over extended periods of use.
10) To provide E.I.'s which have integral forearm supports thus increasing the convenience and acceptance of their use.
11) To provide E.I.'s requiring natural motion of the fingertips and hands(i.e. pulling toward the palm/forearm as opposed to pushing or striking).
12) To provide E.I.'s which force the hand into a true prehensile or grasping position.
13) To provide a convex declined keyboard surface which allows the hands and forearms to be comfortably supported while minimal hand and wrist movement is required for key actuation.
14) To provide a convex declined keyboard surface which has the keys arranged normally(perpendicular) to the keyboard face thus allowing the fingers to "pull" the keys while in the prehensile or grasping position.
15) To provide E.I.'s which encourage the user to memorize the key locations and their associated characters or functions by locating the keys in such a way that it is difficult to view them. This encouragement to memorize, if acted upon, will increase the productivity of the user by increasing his or her data entry speed.
16) To provide palm support in a convenient manner such that keys can easily be reached even while the palm is supported, while also maintaining an angle of greater than or equal to 180 degrees between the top of hand and the top of the forearm of the user.

17) To provide E.I.'s with a convenient method of utilizing one's cursor position control in one's lap, while creating an angle greater than or equal to 180 degrees between the top of the hand, and the top of the forearm of the user.
18) To provide E.I.'s with integral thumb recesses.
19) To provide E.I.'s with grab handles for convenient movement of E.I.
20) To provide E.I.'s with convenient power cord storage space.
21) To provide E.I.'s with a recessed area for the user's stomach( i.e. belly space).
22) To provide lap mounted E.I.'s contoured for groin and scrotal area.
23) To provide E.I.'s with cursor position control centrally located on forward side of convex declined surface, or centrally located on reverse side of cursor control pad.
24) To provide E.I.'s with dual space bars centrally located in recessed thumb area, such that they may be actuated by the natural grasping motion of the thumbs.
25) To provide E.I.'s which allow the fingers and thumbs to comfortably wrap around the keyboard surface in a grasping position.
26) To provide cursor control pads which incorporate a convex declined shape for the cursor control surface.

Further objects and advantages will become apparent from a consideration of the ensuing description and drawings.

DRAWING FIGURES

FIG. 24 shows a perspective view of a user's lap with a lap mounted cursor control(mouse) pad in his or her lap.

FIG. 25 shows a side view of a lap mounted cursor control(mouse) pad illustrating the convex shape of the control pad surface as well as the recessed portion for the user's leg.

FIG. 26 shows a top view of a lap mounted cursor control(mouse) pad illustrating the convex shape of the control pad surface as well as the recessed portion for the user's forearm.

FIG. 27 shows a side view of a lap mounted cursor control(mouse)pad with a user's hand and forearm and a cursor control device(mouse), generally illustrating the angle of greater than or equal to 180 degrees created between the top of the hand and the top of the forearm of the user.

FIG. 28 shows a perspective view of an aircraft pilot using a keyboard having palm and forearm support in the lap mounted position.

DESCRIPTION OF INVENTION

Figure 1:
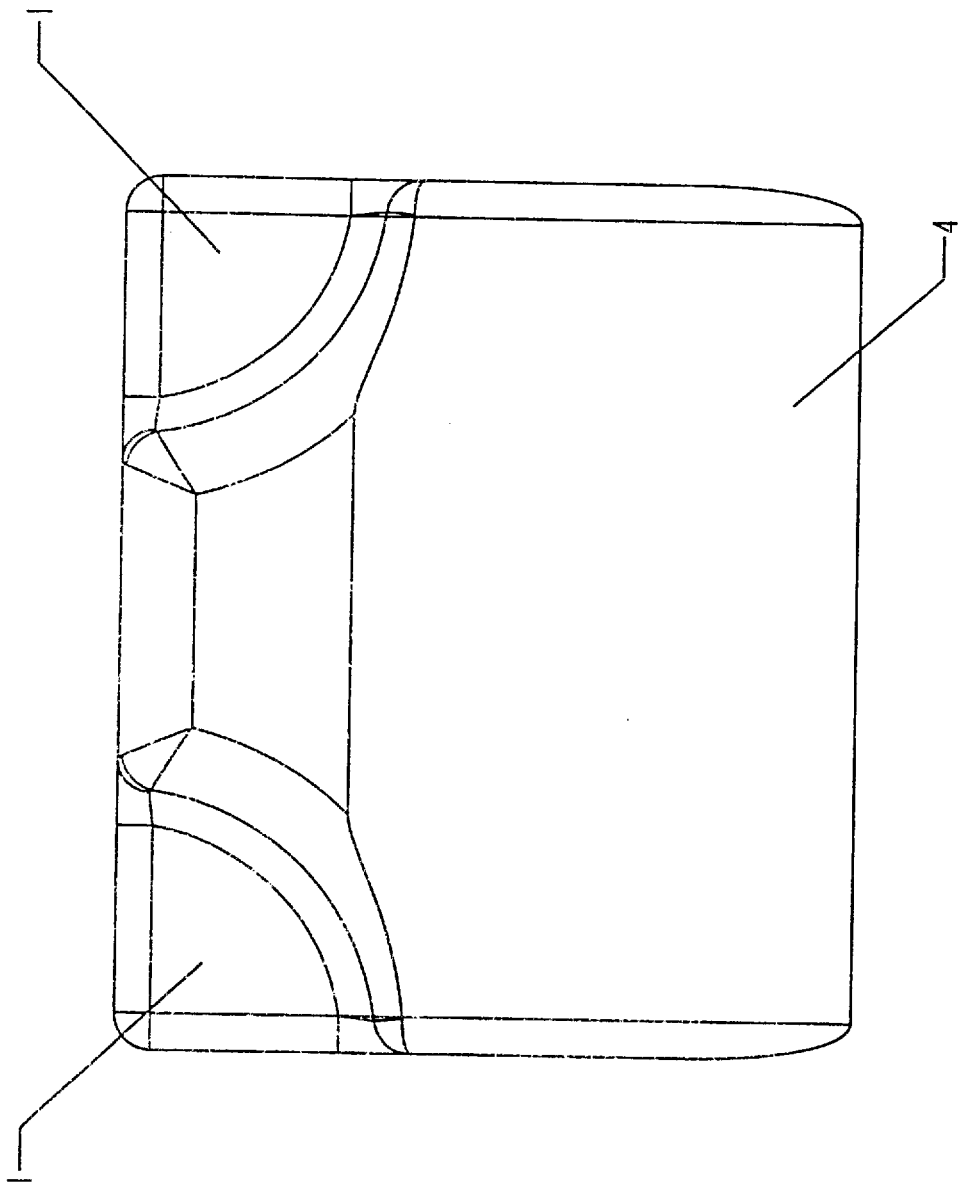
FIG. 1 shows a top view of a palm support device.
Figure 2:
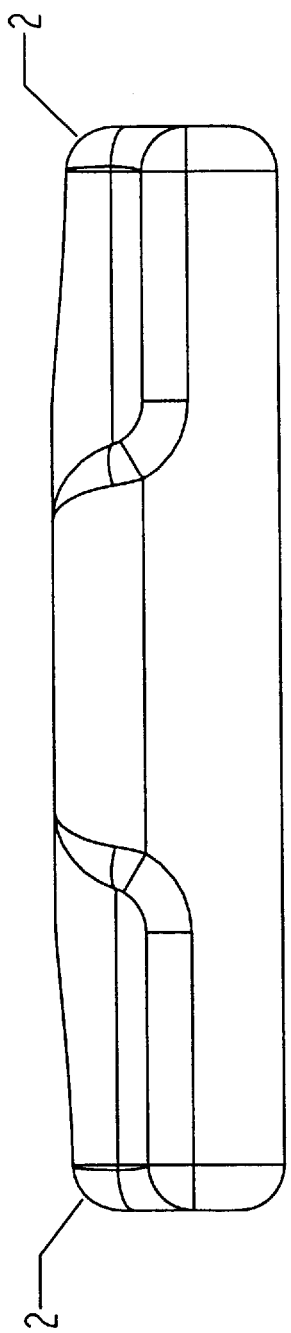
FIG. 2 shows a rear view of a palm support device.

An ergonomic interface of the invention particularly reduces the onset and severity of, or prevents entirely, the repetitive strain injury known as carpal tunnel syndrome, as well as other neurological or orthopedic malfunctions, such as tendinitis and tenosynovitis, which can also be related to usage of a flat/rectangular manually actuated data entry device. These malfunctions, particularly carpal tunnel syndrome, occur when using a flat/rectangular manually actuated data entry device or other data entry device which requires the hands to be fully pronated into the horizontal plane and ulnar-deviated outward at the hand-wrist junction, with a finger-flexed position. In this position, there is mechanical compression of the median nerve against the transverse carpal ligament(complicated by venous congestion) as the median nerve passes from the forearm into the hand. In this position, percussion of each key is executed in a direction which is essentially away from the action and the range of motion of the opposable thumb.

In describing the preferred embodiments of the invention illustrated in the drawings, specific terminology will be utilized to for the sake of clarity. However, the invention is not intended to be limited to the specific terms so selected, and it is to be understood that each specific term includes all technical equivalents which operate in a similar manner to accomplish a similar purpose. Thus, the following detailed description illustrates the invention by way of example not by way of limitation of the principles of the invention. This description will clearly enable one skilled in the art to make and use the invention and describes embodiments which are believed to be the best mode for carrying out the invention.

FIGS. 1 through 34 show in detail some of the preferred embodiments of the invention. The preferred materials of construction are to be "soft". The material of construction is only limited in that it be rigid enough to maintain the intended shape of the invention. Other possibilities could include rigid substrates that are not soft which are encased within "soft" materials. The particulars of the materials and structure are known to those with skill in the art and are not shown in detail. This description of materials is not intended to limit the type used but is intended to suggest preferred materials; when created, materials used in construction could be virtually any.

DESCRIPTION OF ERGONOMIC DATA ENTRY DEVICE 52

Reference FIG. 11–23,33 and 34

Figure 11:
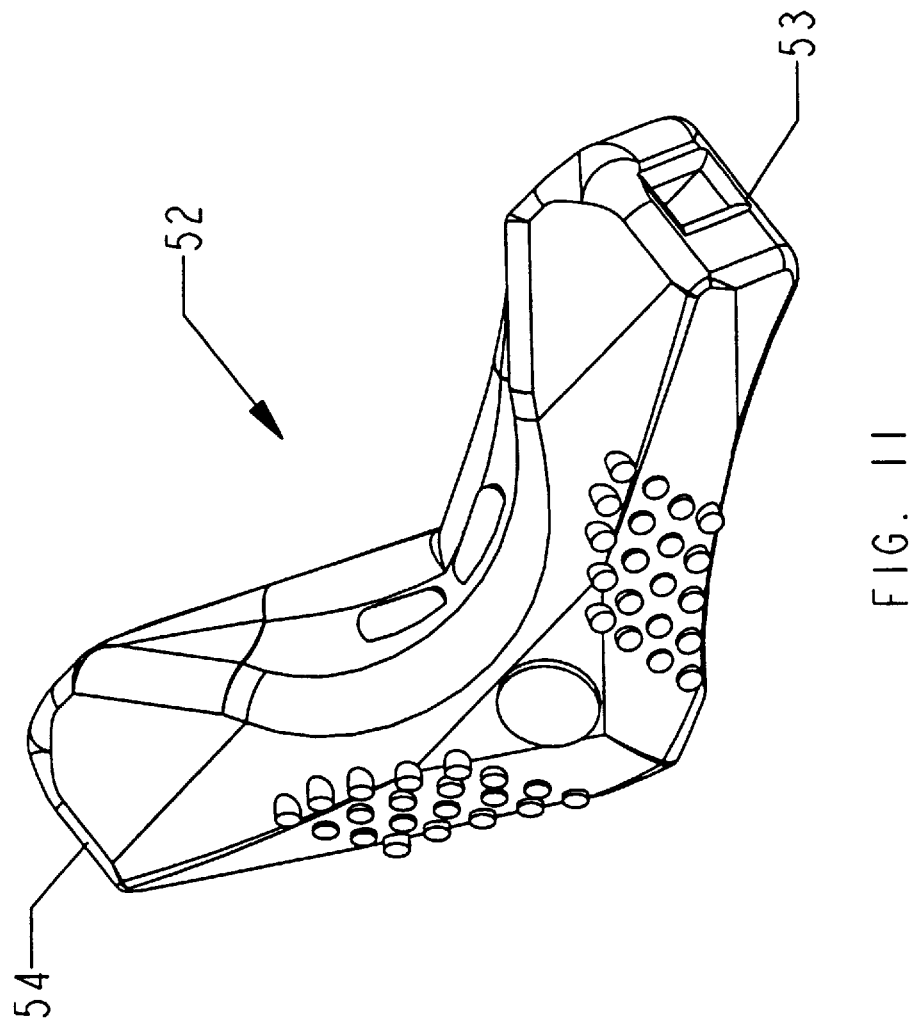
FIG. 11 shows a perspective view of a keyboard having palm and forearm support generally illustrating the top-front portion of the keyboard and cursor control, keys, stomach recess, and grab handle locations.
Figure 12:
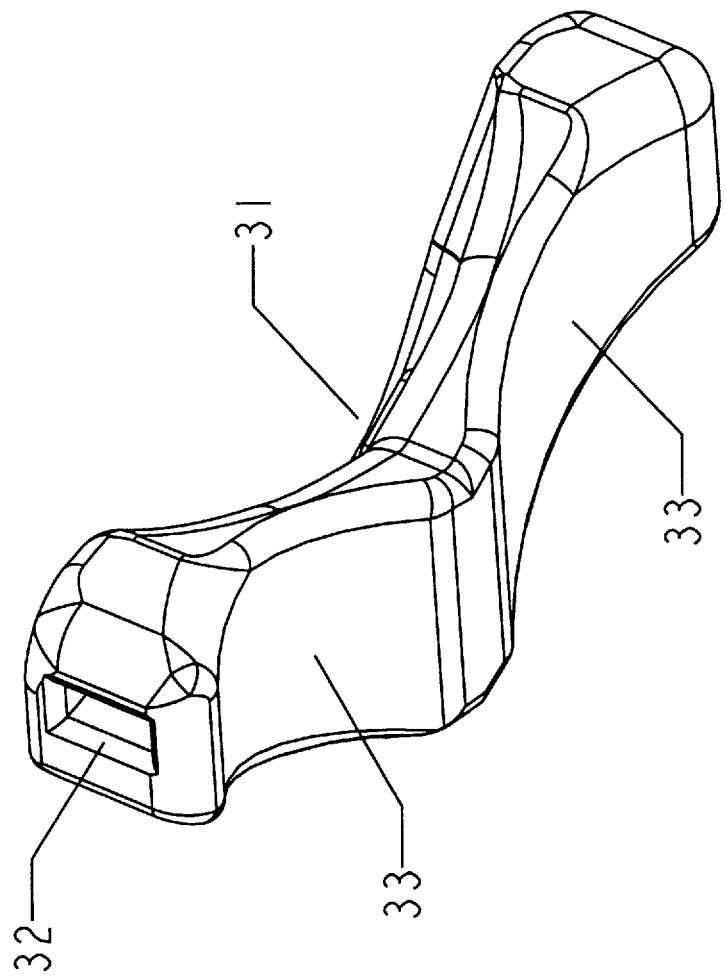
FIG. 12 shows a perspective view of a keyboard having palm and forearm support generally illustrating the bottom-rear portion of the keyboard and leg recess, grab handle, and stomach recess locations.

FIG. 11 shows a perspective view of ergonomic data entry device requiring manual actuation of data entry mechanisms herein referred to as computer keyboard 52. Computer keyboard 52 having left end 53 and right end 54. FIG. 12 shows computer keyboard 52, illustrating the bottom-rear portion of the computer keyboard 52 having leg recesses 33, grab handles 32, and stomach recess 31. The side view of computer keyboard 52 is shown in FIG. 17.

Figure 17:
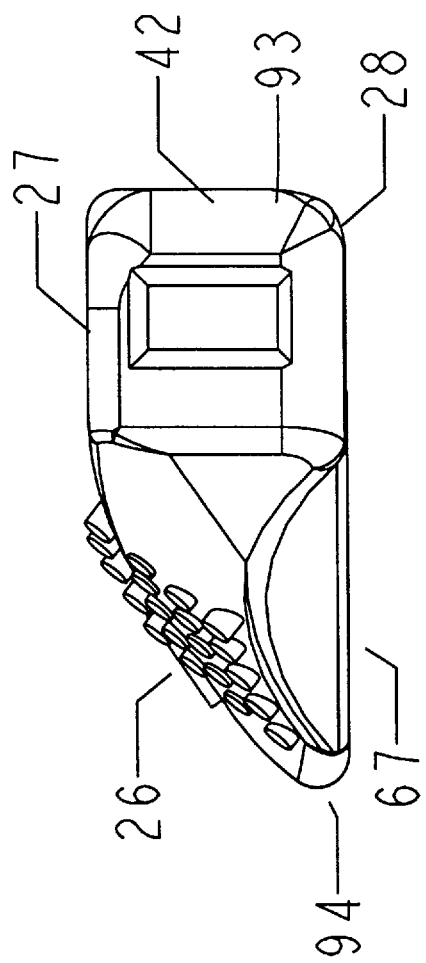
FIG. 17 shows a side view of a keyboard having palm and forearm support, forward edge centrally located cursor control(mouse), stomach recess, leg recesses, grab handles, and space bars.
Figure 23:
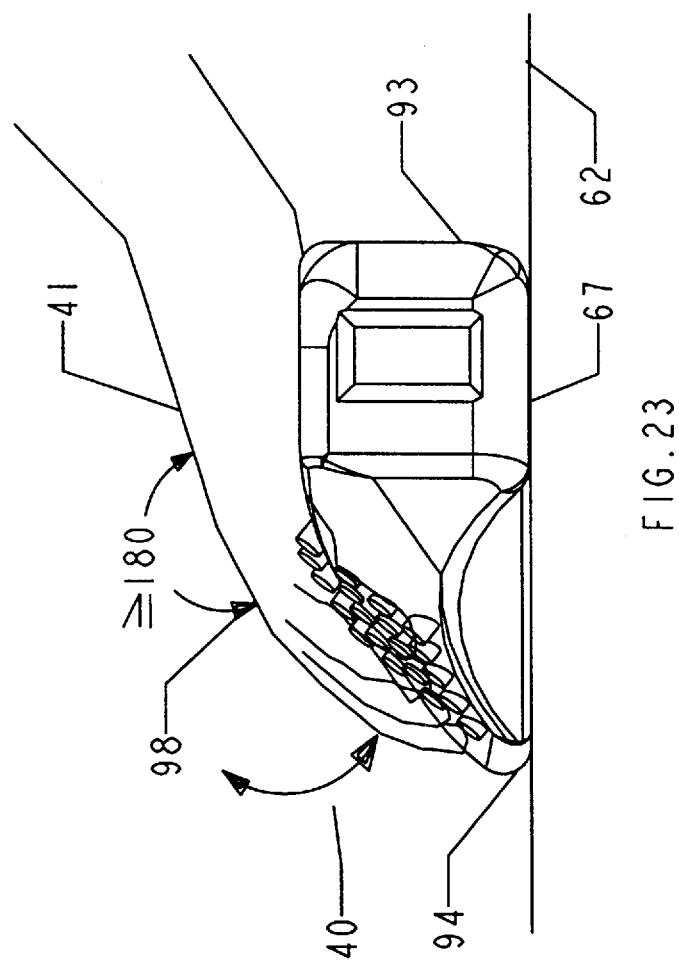
FIG. 23 shows a side view of a keyboard with palm and forearm support with the keyboard user's hands and forearms at rest, generally illustrating the angle of greater than or equal to 180 degrees between the top of the hand and the top of the forearm of the user, as well as the pulling motion of the user's fingers.

FIG. 17 shows computer keyboard 52 having base 67, front 94 and rear 93. Base 67 is adjacent to raised rear edge 42 which extends for the purposes of illustration perpendicularly upwards to the plane created by forearm support 27, these three surfaces creating the rear 93. Forearm support 27 is to be above base 67, the height above to be defined as sufficient to create an angle of greater than or equal to 180 degrees between the top of the user's hands 98, and the top of the user's forearm 41, as shown in FIG. 23. Forearm support 27 is adjacent to both raised rear edge 42 and convex declined surface 26. Convex declined surface 26 is declined from forearm support 27, down toward base 67, and away from rear 93; thus, creating at the junction of the base 67, and convex declined surface 26, the front 94. The purpose of convex declined surface 26 is to arrange keys 96 relative to the user's hands, such that keys 96 may be actuated by a more natural grasping motion of the user's fingers and/or hands. Convex declined surface 26 also places the user's hands and fingers into a truly prehensile or grasping position, greatly improving upon current technology. Convex declined surface 26 also improves upon existing technology by allowing the user's fingers to comfortably use keys 96 as a result of their normal location relative to convex declined surface 26, described within following paragraphs.

Figure 19:
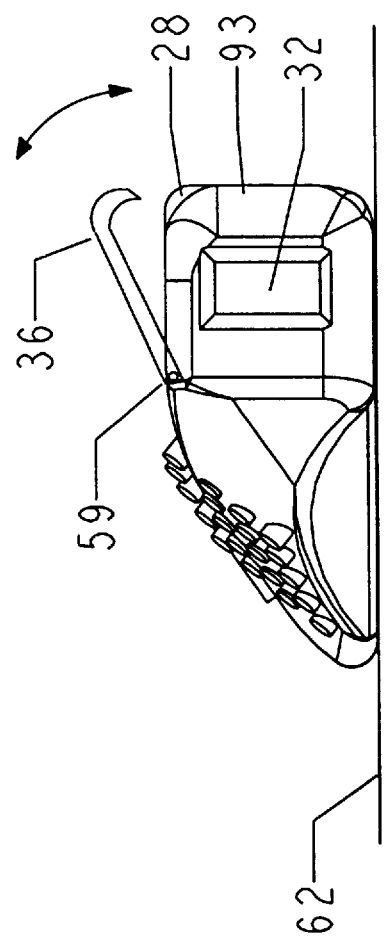
FIG. 19 shows a side view of a keyboard having palm and forearm support, forward edge centrally located cursor control(mouse), stomach recess, leg recesses, grab handles, and space bars and adjustable forearm support.
Figure 20:
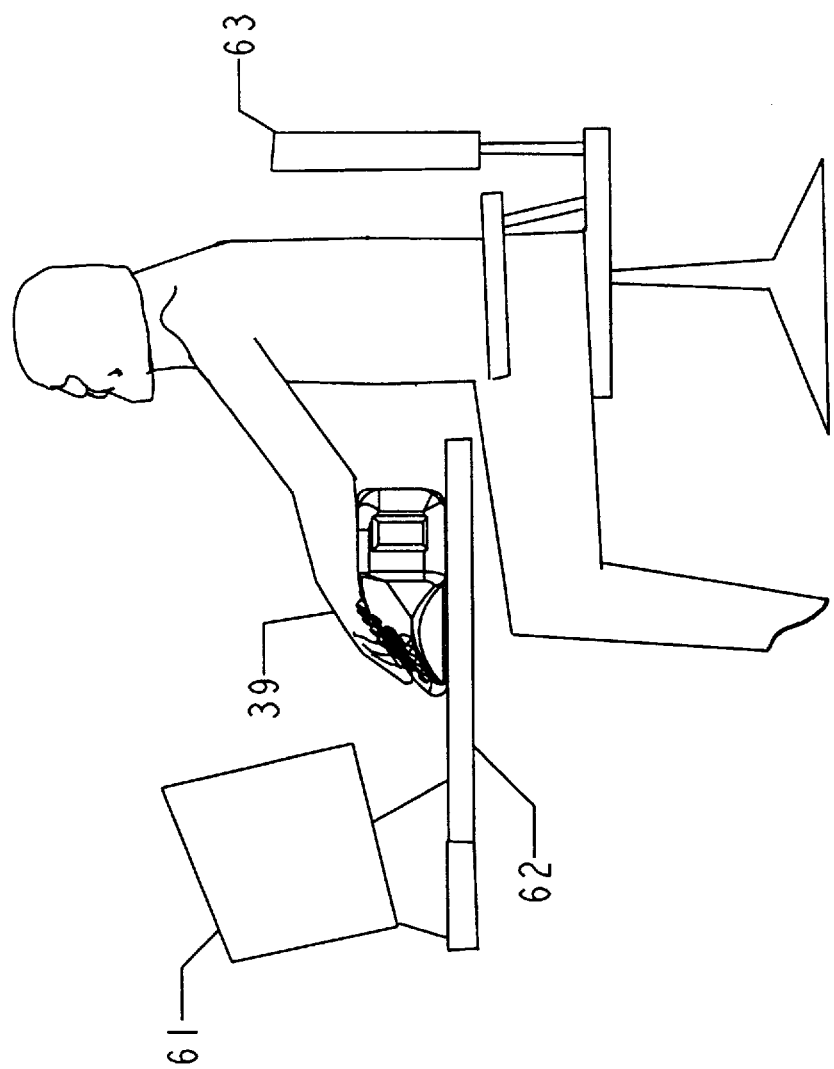
FIG. 20 shows a side view of a user with a keyboard having palm and forearm support in the table mounted position.

FIG. 19 shows adjustable forearm support 36 attached to computer keyboard 52 by hinge 59. This representation of adjustable forearm support 36 is merely to capture the idea of adjustability and do not limit the means of adjustment to those here mentioned. The particulars of installing hinge 59 as means of attachment for adjustable forearm support 36 to computer keyboard 52 are well known to those with skill in the art and are not shown in detail.

FIG. 19 shows grab handles 32 which are located forward of rear 93. Grab handles 32 having central axis perpendicular to rear 93. The location or shape or other variation not mentioned of grab handles 32 is not to be limited and are shown here for the purposes of illustration only. Grab handles 32 could be rendered as protrusions for grasping or the like. Grab handles 32 improve over the current art in that current devices of similar nature do not have grab handles 32 at all, and it is therefore difficult to move these devices around on working surface 62. Grab handles 32 enable the user to conveniently relocate computer keyboard 52 upon working surface 62 by inserting fingers into grab handles 32. All edges of computer keyboard 52 having large radii 28 with radii blending together at all edges such that no rough or sharp edges are exposed to the user's hands 98 and forearms 41.

To avoid limiting the size of the radius of edges, one may consider for the purposes of illustration, that the radii upon all edges of computer keyboard 52 could be comparable to the radii found on the skin surface of the human hand (example: 0.5 to 1 inch).

Figure 14:
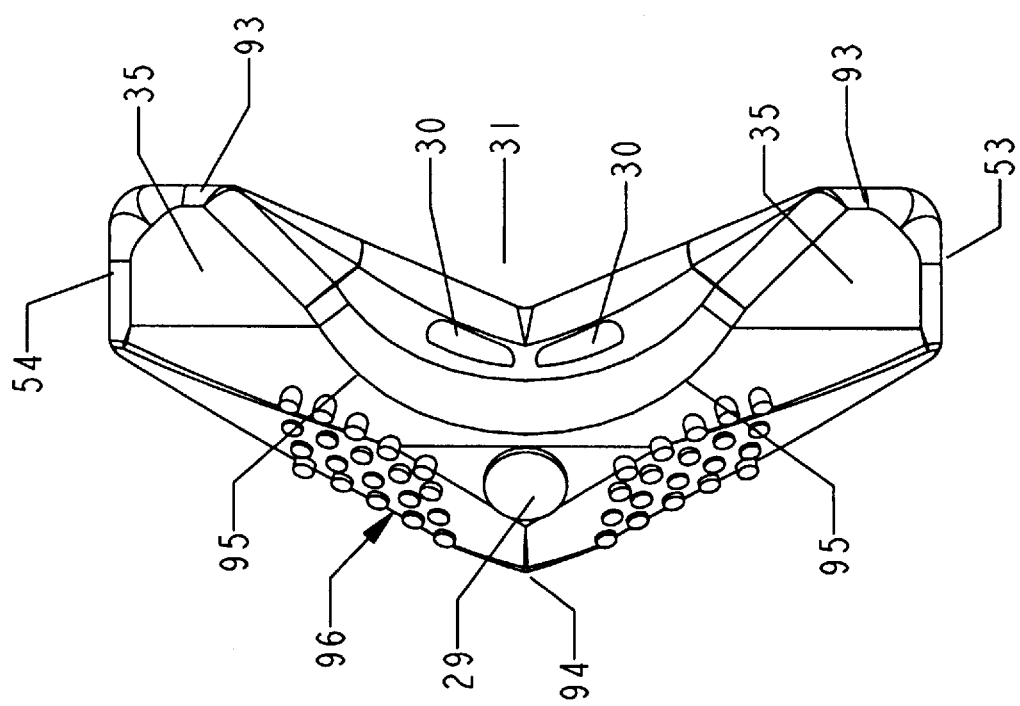
FIG. 14 shows a top view of a keyboard having palm and forearm support, forward edge centrally located cursor control(mouse), stomach recess, and space bars.

FIG. 14 shows a top view of computer keyboard 52 having left end 53 and right end 54 symmetrical about central plane normal to base 67. Computer keyboard 52 is shown to be generally "V" or wing shaped with the central portion forward of the left end 53 and right end 54. The general "V" or wing shape could also be a "U" shape, a "horse-shoe" shape or the like. The only limitation on the shape would be that while used, an angle of greater than or equal to 180 degrees be created between the top of the user's hands 98, and the top of the user's forearms 41. The convex declined surface 26, of FIG. 17, follows the general "V" shape from left end 53 to center, and from right end 54 to center forming one continuous convex declined surface 26 from left end 53 to center and from right end 54 to center.

The apex of the "V" shape forming the front 94 which is to be aimed away from the user's body while in use. The two ends of the "V" shape forming the rear 93.

Figure 16:
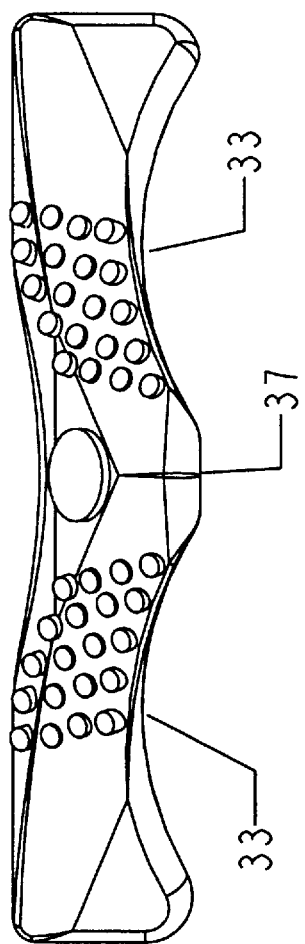
FIG. 16 shows a front view of a keyboard having palm and forearm support, forward edge centrally located cursor control(mouse), stomach recess, leg recesses, and space bars.

The convex declined surface 26, of FIG. 17, is also of convex declined shape when viewed from the front, FIG. 16. In other words, the surface generated by convex surface 26 has two or more radii of convexity. This description is not intended to limit the curves of computer keyboard 52 in any way. This description is merely to make the reader aware that there are many different curves and shapes that could define computer keyboard 52 while still maintaining the desired functionality. This feature of computer keyboard 52 is a unique improvement over existing keyboards because it allows the hands to be draped comfortably over computer keyboard 52 in a truly prehensile or grasping position. The radii of the convex surfaces could be modified extensively to change the position of the user's hands in such a manner that most ideally fits the prehensile grip of the user.

FIG. 14 shows, immediately opposite the front 94, on the rear side 93, belly recess portion 31. Belly recess portion 31 allows the user to comfortably "snug" computer keyboard 52 up to the user's belly while in the user's lap.

Figure 13:
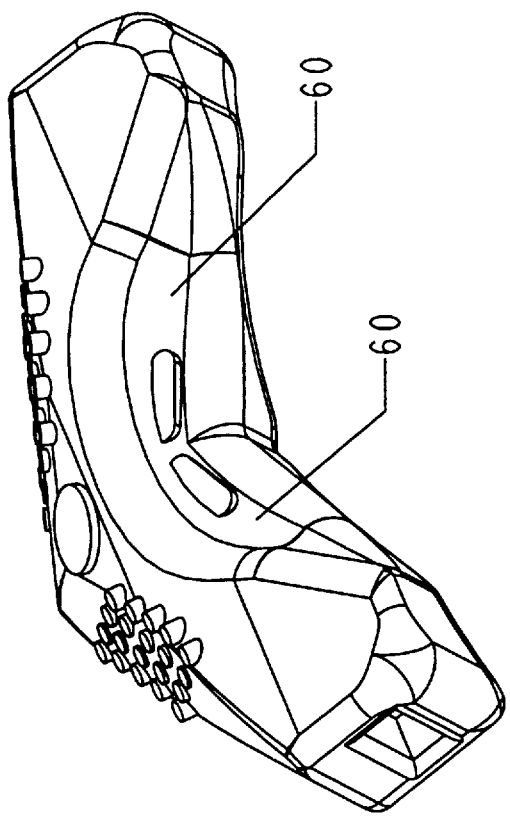
FIG. 13 shows a perspective view of a keyboard having palm and forearm support generally illustrating the top-rear portion of the keyboard, thumb recess, space bar, stomach recess, and grab handle locations.
Figure 33:
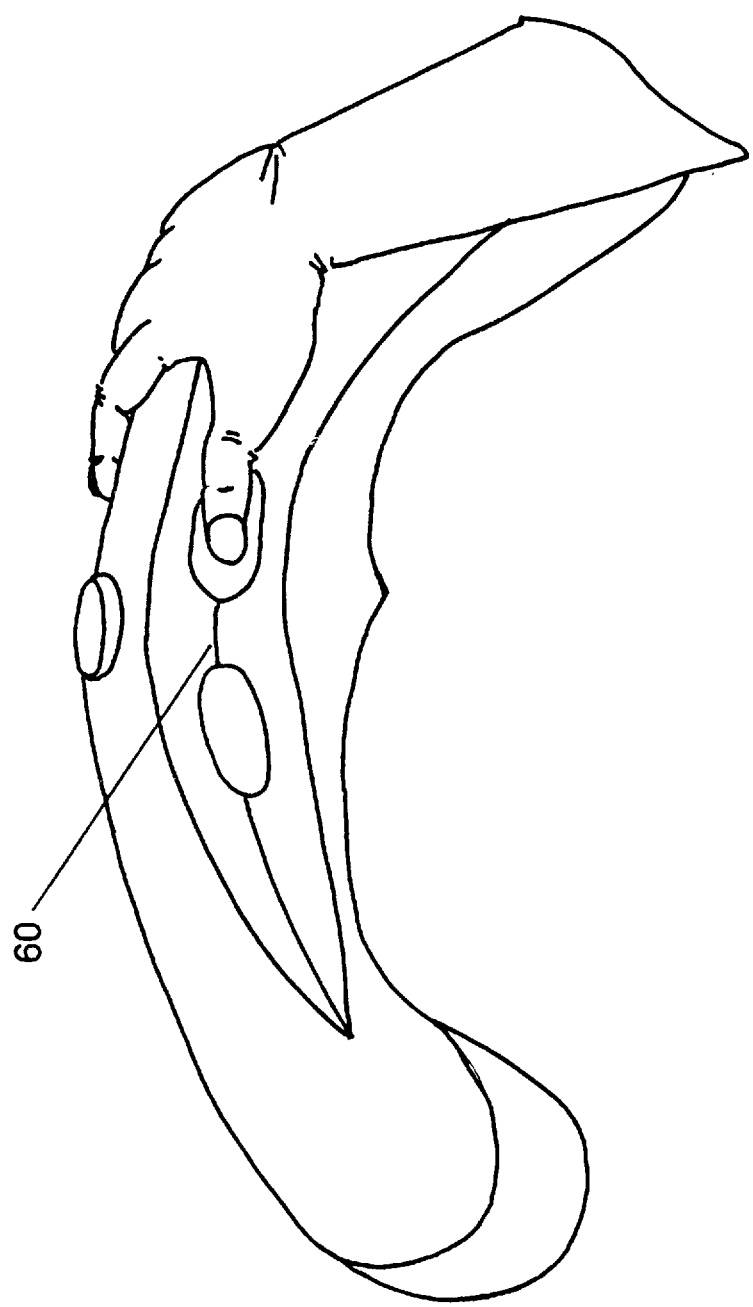
FIG. 33 shows a perspective view of a computer keyboard.

FIG. 13 shows, at the apex of the "V" shape, on the rear side 93, thumb recess region 60. Thumb recess region 60 is located in the entire area that the thumbs would occupy if the user's palms were placed upon palm supports 95 as illustrated in FIG. 33. Thumb recess region 60 is generally adjacent to the belly recess region 31, extending from the central plane normal to base 67, toward rear 93 symmetrically. Thumb recess region 60 is also adjacent to palm supports 95 and forearm supports 35, generally extending down from palm supports 95 and forearm supports 35, toward base 67. Thumb recess region 60, is shown here for illustration only and the shape could consist of virtually any while maintaining the concept of a thumb recess region. Thumb recess region 60 could also be modified such that the rear portion adjacent to the belly recess 31 is removed entirely, leaving only a curved surface for the thumb to wrap around in a grasping position.

FIG. 14 also shows two space bars 30, located normal to thumb recess region surface 60, located symmetrically about the central plane. Space bars 30 are located such that while the user's hands are resting upon computer keyboard 52, the user's thumbs are adjacent to space bars 30. This configuration allows the user to press space bars 30 without moving the user's hands at all. This unique idea allows maximum comfort and minimal effort while using computer keyboard 52. Space bars 30 are shown here for illustration and many variances upon this theme are not to be limited(more than 2 or different shapes etc.).

FIG. 14 also shows cursor position control 29, centrally located on the forward portion of computer keyboard 52, located normal(in the case of planar type control devices or the like) to convex declined surface 26, of FIG. 17. Cursor position control 29 is located centrally near the apex of the "V". This location of cursor position control 29 allows the user to utilize cursor position control 29 without moving his or her hands from the resting position at all. This arrangement will greatly reduce the amount of discomfort and time taken when continuously transferring the hands from keyboard to cursor control and vice versa.

FIG. 14 also shows keys 96 or other manually actuated data input sensors. The particulars of installing keys 96 in computer keyboard 52 and the electronics which indicate when a key is actuated are well known to those with skill in the art and are not shown in detail. Keys 96 to be located symmetrically about central plane normal to base 67, having axis of translation or axis of actuation force normal to convex declined surface 26, of FIG. 17. This configuration of keys 96 allows the hands of the user to comfortably drape over the computer keyboard 52 and actuate keys 96 with minimal movement or effort in a grasping motion. The location of keys 96 encourage the user to memorize the keys 96 locations and their associated characters or functions by locating the keys 96 in such a way that it is difficult to view them. This encouragement to memorize, if acted upon, will increase the productivity of the user by increasing his or her data entry speed. This method of teaching key memorization is commonly used by typing instructors as a means of improving performance and reducing typographical errors. The keys 96, and their functions, maintain the standard "QWERTY" format used commonly on typewriters etc.

The keys 96 relation to one another are not of standard position. The keys 96 are located such that when the fingers of the user are moved to each key, the location of the key is that defined by the motion of the fingertips of the user as the fingertips move in their most natural path toward or away from the palm of the hand.

FIG. 16 shows a front view of computer keyboard 52 having dual leg recess areas 33. Dual leg recess area 33 forms a three point support located at and forming base 67 for computer keyboard 52. Unique in that dual recess 33 is symmetrical about the central plane normal to base 67, in that dual recess 33 has a non-parallel axis to the convex declined surface 26, upon which keys 96 are normally located, and that dual recess 33 maintains an angle of greater than or equal to 180 degrees between the top of the user's hands 98 and the top of the user's forearm 41 while in use. Dual recess 33 greatly improves upon existing technology by concentrating upon the angle between the hand-wrist joint and simultaneously improves the overall comfort of the computer keyboard 52 user. Dual leg recess 37 is also to be contoured in such a way as to fit comfortably into the groin area of the user such that when "snugged" up to the user's belly, a comfortable fit is created. The dimensions of dual recess 33 are shown for illustration only and are not to be limited. Generally, the intention of dual recess 33 is to create a central protrusion 37 which serves a dual purpose. The first purpose of protrusion 37 is to locate computer keyboard 52 relative to user's legs while in the lap of the user. Secondly, it could act as a power cord storage space located within protrusion 37.

Figure 34:
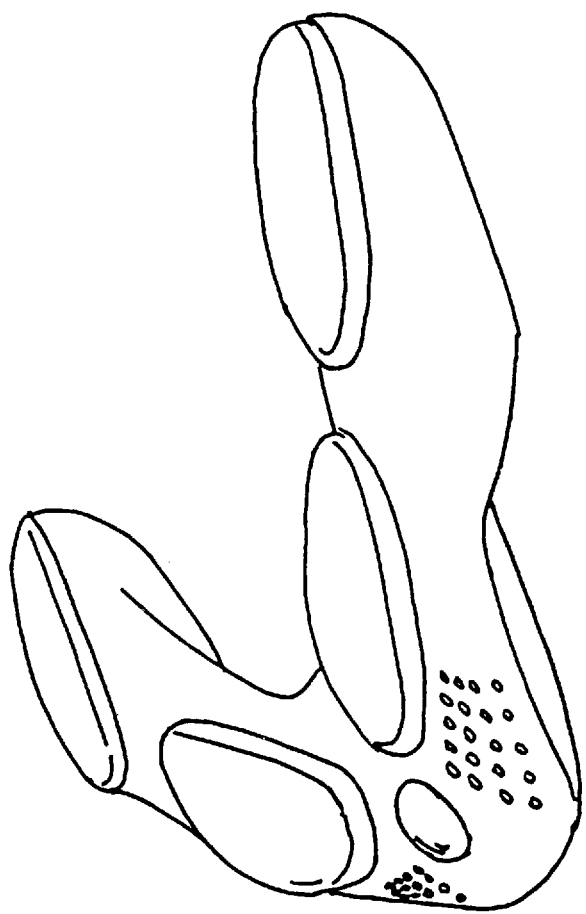
FIG. 34 shows a perspective view of a computer keyboard with silicon palm and forearm support.

FIG. 34 shows a perspective view of an additional embodiment of computer keyboard 52 having silicon palm and forearm supports for additional comfort.

DESCRIPTION OF USE ERGONOMIC DATA ENTRY DEVICE 52

Reference FIG. 11–23,33, and 34

FIG. 23 shows ergonomic data entry device or computer keyboard 52 is used by placing computer keyboard 52 upon working surface 62 having base 67 adjacent to working surface 62. Rear 93 is placed close to the user with front 94 furthest from the user. The location of computer keyboard 52 should be such that the palms of the hands can be comfortably placed in a prone position upon palm supports 95 shown in FIG. 14, and the forearms can be comfortably placed upon forearm supports 35, of FIG. 14. The thumbs of the hands are to be laid over and down into thumb recesses 60 as shown in FIG. 33, laying fingers over convex declined keyboard surface 26, of FIG. 17.

The user's arms now comfortably supported by, palm supports 95, and forearm supports 35, of FIG. 14. Convex declined keyboard surface 26, of FIG. 17, allows the hands and forearms to be arranged such that an angle of greater than or equal to 180 degrees is created between the top of the user's hands 98 and the top of the user's forearms 41.

The convex declined keyboard surface 26 allows the fingers to conveniently utilize the keys 96 in a pulling or grasping motion as opposed to a pushing or striking motion as is currently used in existing devices. Natural prehensile or grasping motion is thus attained. Arrangement of keys 96 upon convex declined keyboard surface 26 improves upon existing technology by facilitating the natural motion of the fingers of the hand in a truly prehensile or grasping motion.

It is obvious from the evolutionary process, and the location of opposable thumbs, that the human hand has been formed to grasp objects. The natural path of the fingers and thumbs in the grasping process is to move fingers either radially away from the palm, or radially toward the palm of the hand. Therefore, a simple consideration would reveal that the hand has evolved to withstand more use and more stress with this type of motion. As further example of the accuracy of this statement, one can perform a simple experiment. Lift some light weight, perhaps five pounds, by pulling with the fingers toward the palms of the hands. Then perform the same task by pushing the weight the same distance as before with the tips of the fingers only. One's fingers quickly tire when using the latter method. When utilizing current technology to perform the same task, one must push or strike the keys with the fingers in a motion that forces the fingertips to move away from the palms of the respective hand. Herein lies the problem with existing technology. The computer keyboard 52 solves this problem completely. By utilizing computer keyboard 52, of FIG. 14, the user must actuate keys 96 by pulling or grasping keys 96 located upon convex declined keyboard surface 26, located upon computer keyboard 52, thus using the fingers in their naturally evolved method. Furthermore, the location of thumb recess region 60 and similarly located space bars 30 allow the thumbs of the hands to comfortably drape over palm supports 95 positioning the thumbs into a natural prehensile or grasping position. And, in similar fashion to that described above, the thumbs of the hands must pull together towards the palms of their respective hands to actuate space bars 30. This actuation method having the same results as those mentioned above except with the benefit accorded to the thumbs and their associated joints and ligaments etc.

Cursor position control 29, of FIG. 14, is used by the fingers of the hands while resting upon computer keyboard 52. The convenient and comfortable location of cursor control 29 is in such proximity that the fingertips of either hand may operate cursor control 29 with a minimum of fingertip movement. Operation of cursor control 29 is performed while still maintaining an angle of greater than or equal to 180 degrees between the top of the hands 98, of FIG. 23, and the top of the forearms 41. This location improves greatly upon existing technology which forces the user to either remove a hand completely from the keyboard, or to relocate the hand upon the keyboard, or to use the cursor with the hand in an awkward position. The disclosed references do show keyboard which allows the thumbs to operate the cursor control placed upon the rear side of the keyboard, but without adequate wrist and forearm support it does not seem that it would be comfortable.

Figure 15:
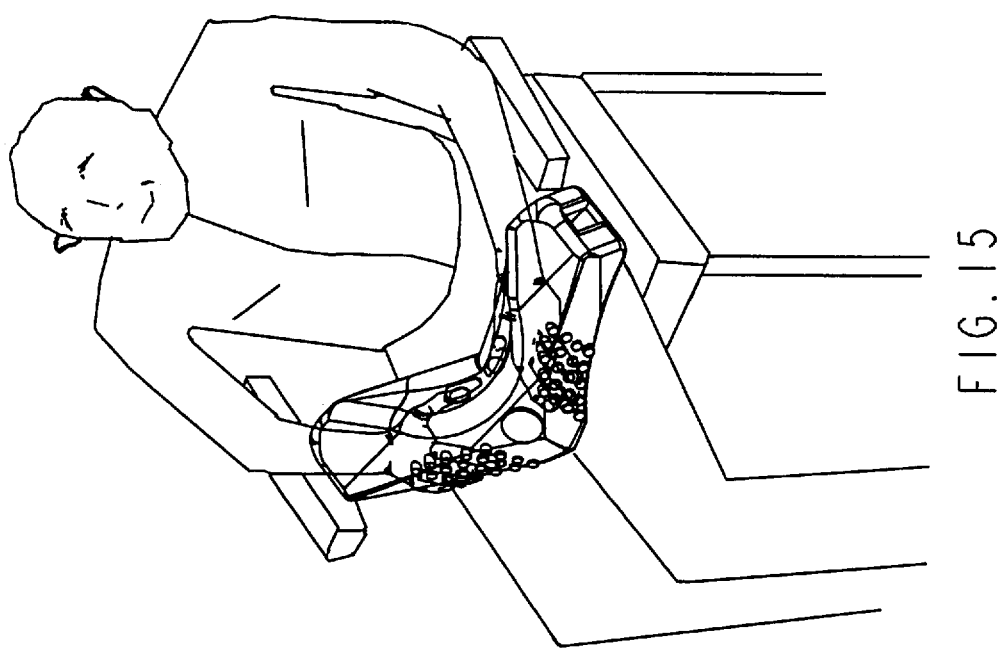
FIG. 15 shows a perspective view of a user with the keyboard having palm and forearm support in the lap mounted position.
Figure 21:
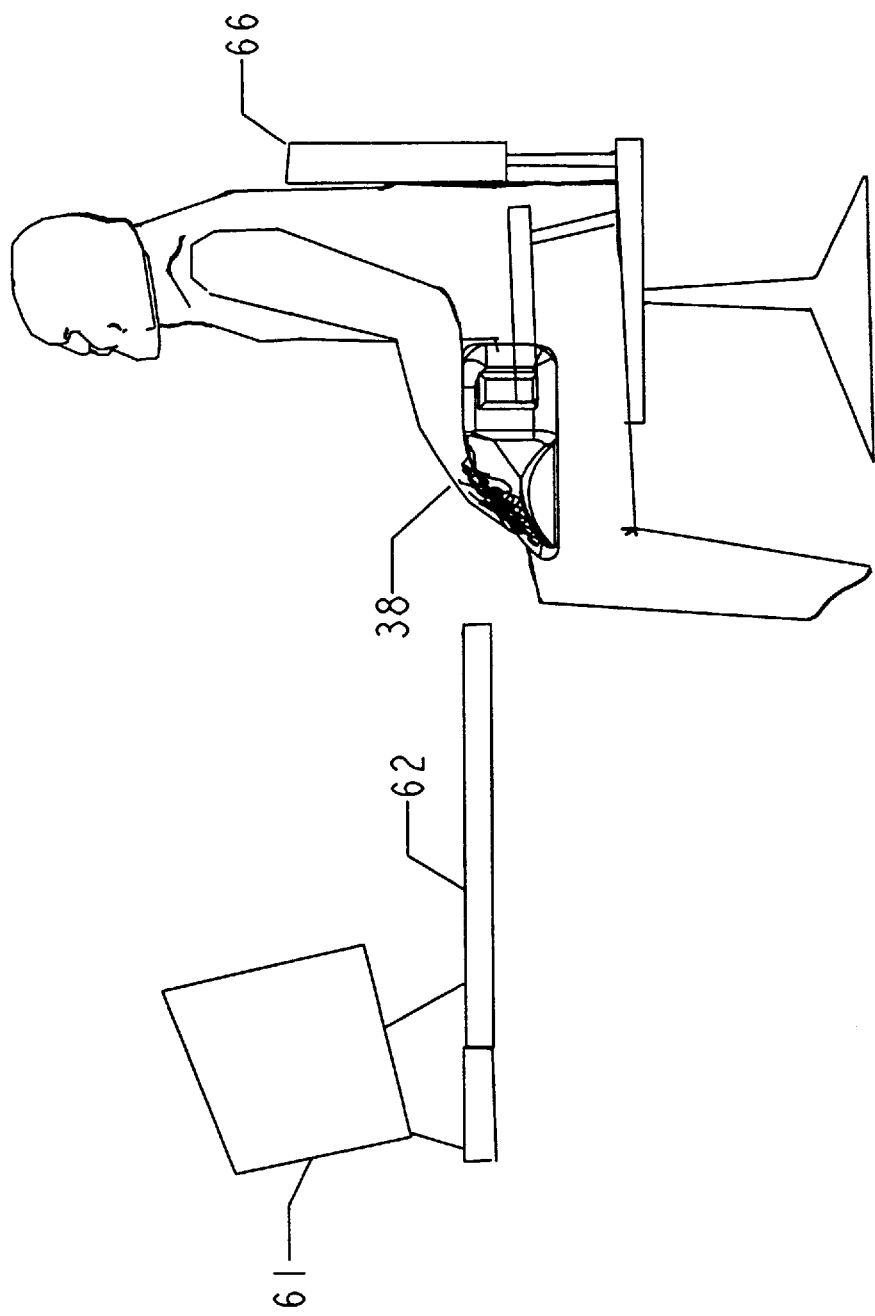
FIG. 21 shows a perspective view of a user with a keyboard having palm and forearm support in the lap mounted position.

Computer keyboard 52 has dual leg recesses 33 of FIG. 16. Dual leg recesses 33 represent what is considered to be the most exciting part of the invention. Computer keyboard 52 is also to be created such that it may be used in the lap of the user. The user simply places computer keyboard 52 having dual recesses 33 placed centrally upon user's lap and snugs the computer keyboard 52 into a comfortable position adjacent to the user's belly. FIG. 15 and FIG. 21 show the computer keyboard 52 in the lap of the user. As depicted, computer keyboard 52, while in the lap of the user, maintains an angle of greater than or equal to 180 degrees between the top of the user's hands 98 and the top of the user's forearm's 41. This innovation improves greatly over the existing keyboards shown in the disclosed references. U.S. Pat. No. 5,120,938, while a lap mounted computer keyboard, does not address the issues of repetitive strain injuries adequately because when used in the lap, the user's keyboard will cause the angle between the palm and wrist to become less than 180 degrees. Also, U.S. Pat. No. 5,120,938 does not incorporate palm and forearm supports or any of the other unique features of my keyboard. The proximity of the keys relative to the fingertips in their respective hand positions are different, and the general functionality is different. The only similarity between the present invention and U.S. Pat. No. 5,120,938 is that both can be used in the lap of the user.

The palm of the hand in conjunction with the bottom side of the forearm have a much larger weight bearing surface than the wrist, and when draped over computer keyboard 52, there is relatively little tension in or pressure upon hand ligaments and joints. By supporting the palm of the hand and the bottom side of the forearm, rather than the wrist, Repetitive Strain Injuries can be significantly reduced, especially in the wrist and thumb joints.

FIG. 19 shows adjustable forearm support 36 used by raising or lowering forearm support 36 to the most user desired location pivoting about hinge 59.

FIG. 19 shows grab handles 32 located on both the left end 53 and the right end 54, which are used by inserting fingers into grab handles 32 and pulling or pushing etc. to relocate computer keyboard 52. Grab handles 32 add convenience to the use of computer keyboard 52.

Figure 18:
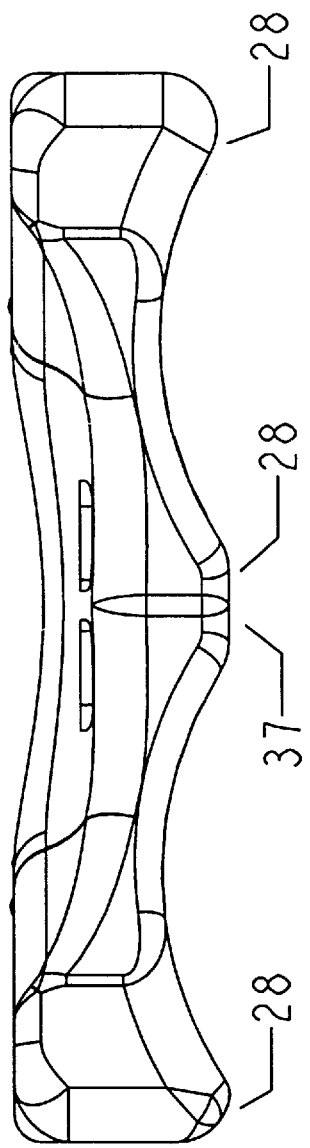
FIG. 18 shows a rear view of a keyboard having palm and forearm support, forward edge centrally located cursor control(mouse), stomach recess, leg recesses, grab handles, and space bars.
Figure 22:
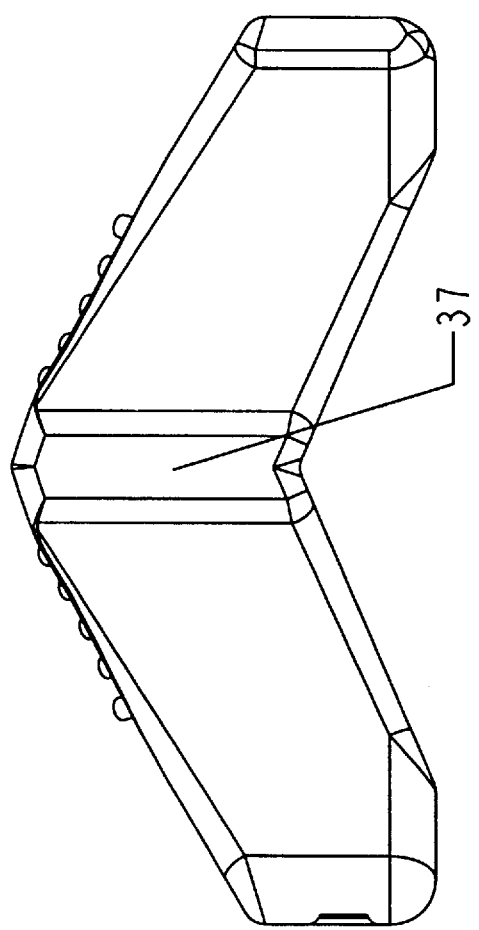
FIG. 22 shows a bottom view of a keyboard having palm and forearm support, forward edge centrally located cursor control(mouse), stomach recess, leg recesses, grab handles, and space bars and adjustable forearm support.

FIG. 22 and FIG. 18 show power cord storage area 37 which could be used to contain excess power supply cord within. The user could remove a detachable cover behind which could contain an additional or excess power supply cord not shown. Details of the construction of power cord storage area 37 are known to those with skill in the art and are not included.

DESCRIPTION OF PALM SUPPORT 43
Reference FIGS. 1–5

Figure 4:
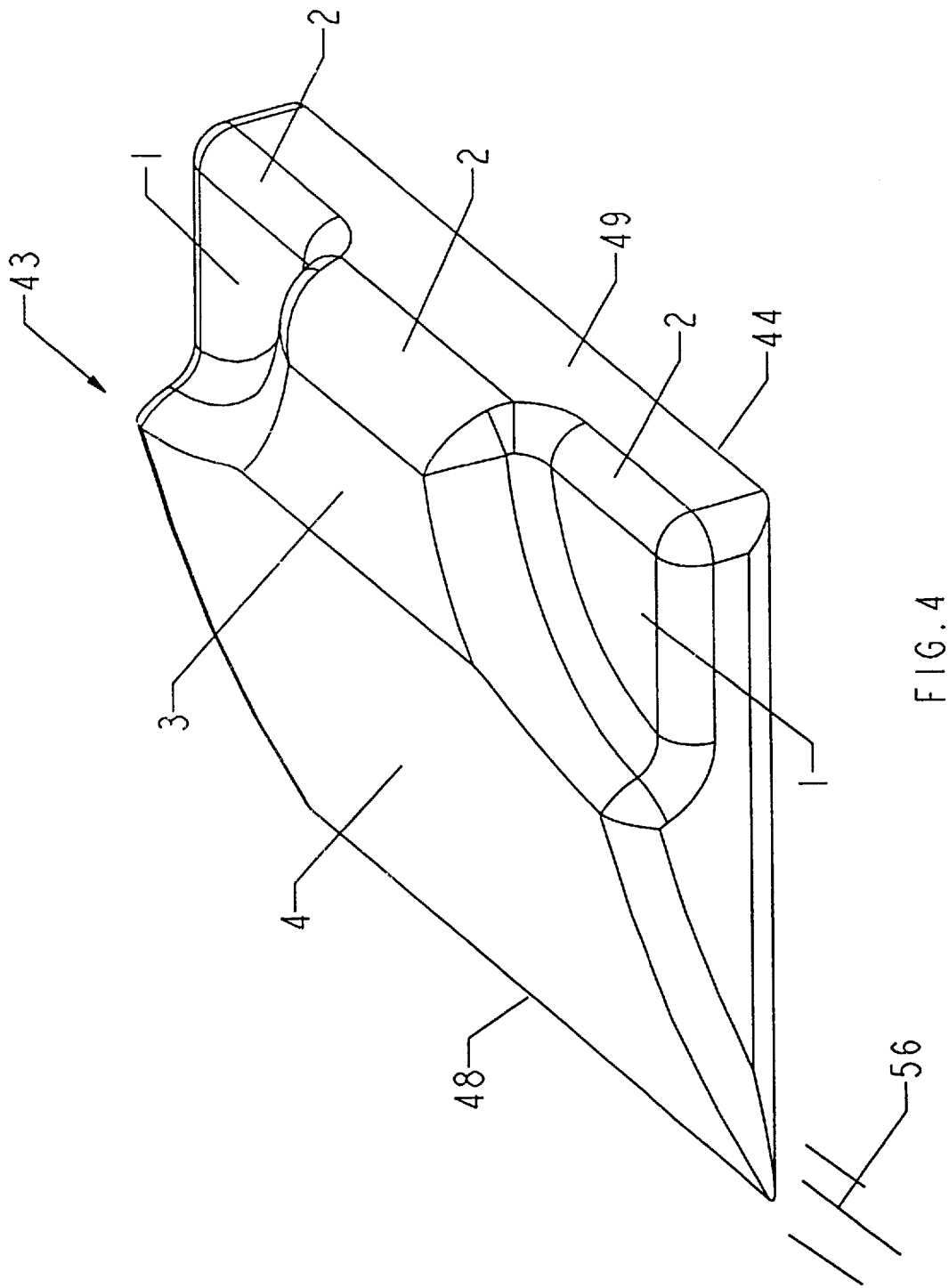
FIG. 4 shows a perspective view of a palm support device.

FIG. 4 is a perspective of a palm support 43 useful as an ergonomic interface support between user and computer, typewriter, control console, automobile, aircraft, health and athletic equipment, machinery, musical keyboard or the like. Palm support 43 having base 44 resting upon working surface 56 having raised palm portion 3 centrally located for the user's left or right hand. Palm support 43 may be made of any suitable rigid or semirigid material. Manufacturing processes could include but not be limited to extrusion molded foam, injection molded foam, silicon filled balloon or bag, vacuum formed plastic, carved wood or any such process lending itself to the concept of user comfort.

Figure 5:
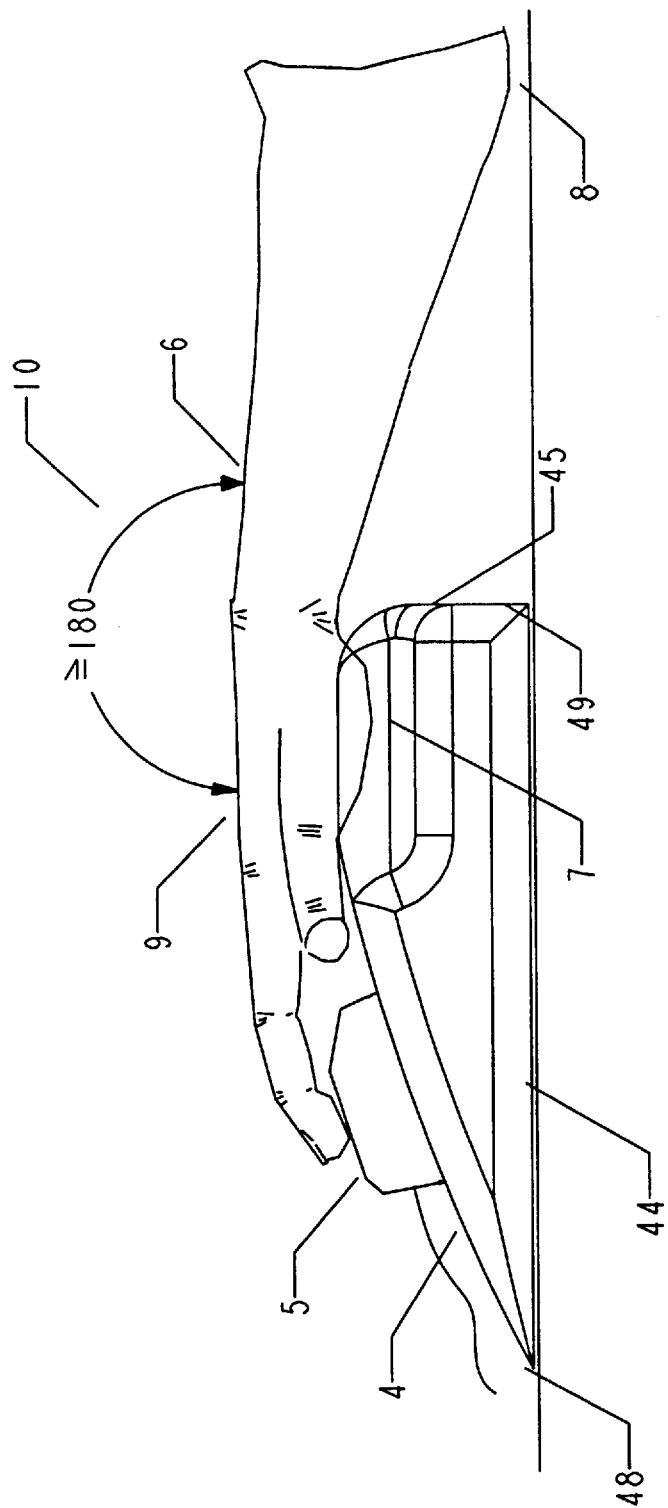
FIG. 5 shows a side view of a palm support device with a user's hand, forearm, and cursor control(mouse).

Palm support 43 having recessed thumb portions 1, shown in FIG. 1 and FIG. 4 such that user's thumb appendage can rest inside as shown in FIG. 5 number 7. All edges of palm support 43 having large radii 2 with radii blending together at all edges such that no rough or sharp edges are exposed to the user's hand 9.

To avoid limiting the size of the radii of edges, one may consider for the purposes of illustration, that the radii could be comparable to the radii found on the skin surface of the human hand(example: 0.5 to 1 inch).

FIG. 5 shows palm support 43 having raised rear edge 45, displayed as perpendicular to base 44 leading up to raised palm portion 3. The perpendicularity is for the purposes of illustration only and may be of any angle. This angle should be limited only in that raised palm portion 3 is above base 44 such that an angle of greater than or equal to 180 degrees is created between the top of the user's hand 9, and the top of the user's forearm 6. This angle to be created with user's elbow 8 on same surface as that of base 44 with the user's palm resting upon the raised palm portion 3.

Figure 3:
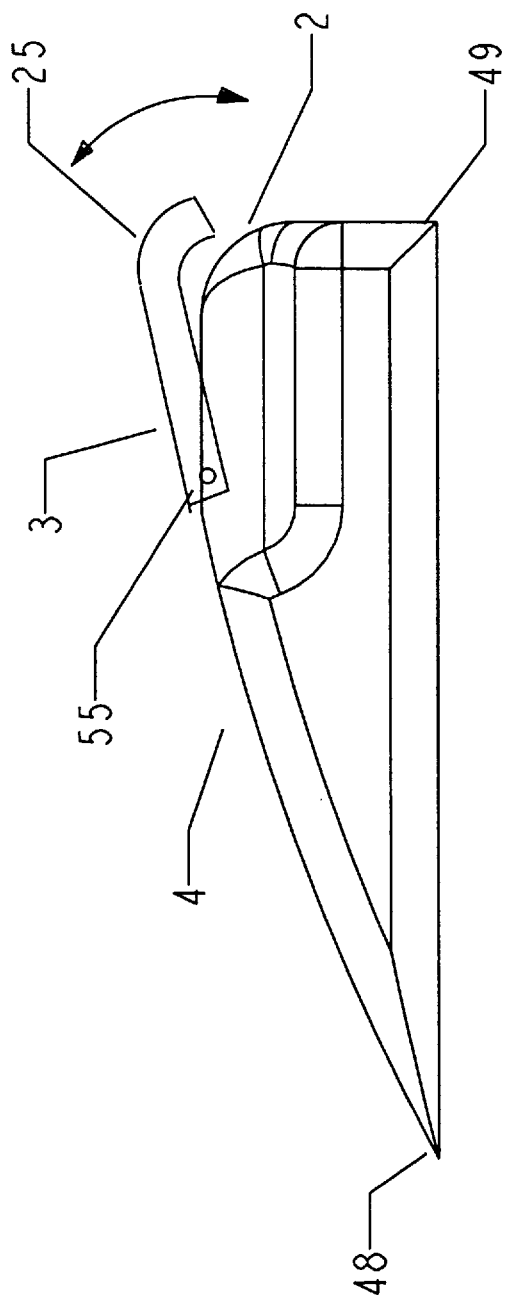
FIG. 3 shows a side view of a palm support device with adjustable palm support.

FIG. 3 shows a side view of palm support 43 having convex declined cursor position control surface 4. Surface 4 is at a declined angle from raised palm portion 3, sloping from the raised plane created by palm portion 3 of the rear 49 down toward the base 44 ending at the front edge 48. The convex shape of surface 4 is intended to enhance the performance of cursor position control devices such as a mouse 5, of FIG. 5, by creating a tangency between the mouse 5 and surface 4. This improves over existing cursor control surfaces because existing cursor control surfaces are flat and deviances in flatness or smoothness lose the tracker ball contact inside the mouse causing bad connections between the tracker ball and motion sensors or the like commonly found in cursor position control devices.

FIG. 3 also shows adjustable palm support 25, attached to palm support 43 by hinge 55. This representation of adjustable palm support 25 is merely to capture the idea of adjustability and does not limit the means of adjustment to those here mentioned. The particulars of installing hinge 55 as means of attachment for palm support 25 to palm support 43 are well known to those with skill in the art and are not shown in detail.

DESCRIPTION OF USE OF PALM SUPPORT 43

FIG. 5 shows palm support 43 is used by placing palm support 43 upon working surface 56 having base 44 adjacent to working surface 56. Rear 49 is placed close to the user with front 48 furthest from the user. The location of palm support 43 should be such that the palm of the hand can be comfortably placed in a prone position upon palm support 3. The thumb of the hand is to be laid over raised palm portion 3 and into thumb recess 7, laying fingers over cursor position control device 5.

By placing the elbow upon the working surface 56, the user's arm is now comfortably supported by the working surface 56, the raised palm support 3, and partially by the cursor position control device 5. The convex declined surface 4 allows the hand and forearm to be arranged such that an angle of greater than or equal to 180 degrees is created between the top of the user's hand 9, and the top of the user's forearm 6. Convex declined surface 4 allows the fingers to conveniently move the cursor control device 5 toward the user by pulling upon the cursor control device 5 toward the palm of the hand in a grasping motion. Natural prehensile or grasping motion is thus attained. When the user wants to move the cursor control away from the user, gravity assists in this translation and reduces the amount of force required to move the cursor control 5 away from the user. Typical cursor control devices 5 cause force by the hand in a direction that is not prehensile or grasping and by reducing the amount of force to move the cursor control 5 away from the user, this force is kept to a minimum without power assist. Transverse motion is attained by moving the cursor control 5 from side to side with the fingers.

The palm of the hand has a much larger weight bearing surface than the wrist, and when draped over palm support 3, there is relatively little tension in or pressure upon the hand ligaments and joints. By supporting the palm of the hand rather than the wrist, Repetitive Strain Injuries can be significantly reduced, especially in the wrist and thumb joints.

FIG. 3 shows adjustable palm support 25 is used by raising or lowering palm support 25 to the most user desired location pivoting about hinge 58.

Palm support 43 could also have grab handles 15 of FIG. 8 discussed in the following paragraphs.

DESCRIPTION OF PALM AND FOREARM SUPPORT 46

Reference FIGS. 6–10

Figure 9:
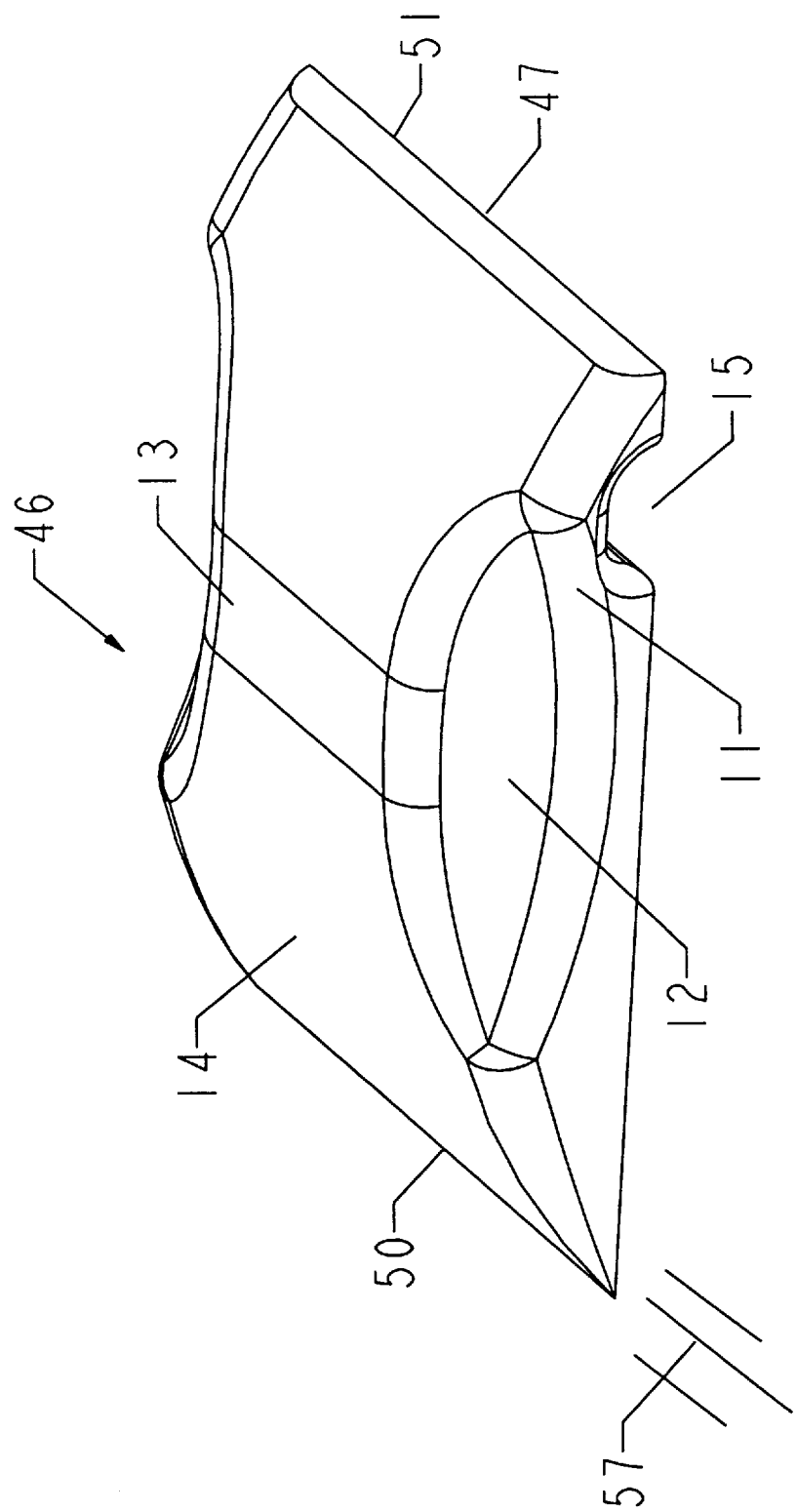
FIG. 9 shows a perspective view of a palm and forearm support device.

FIG. 9 is a perspective of palm and forearm support 46 useful as an ergonomic interface between user and computer, typewriter, control console, automobile, aircraft, health and athletic equipment, machinery, musical keyboard or the like. Palm and forearm support 46 having base 47 resting upon working surface 57 having raised palm portion 13 centrally located for the user's left or right palm. Palm and forearm support 46 may be made of any suitable rigid or semirigid material. Manufacturing processes could include but not be limited to extrusion molded foam, injection molded foam, silicon filled balloon or bag, vacuum formed plastic, carved wood or any such process lending itself to the concept of user comfort.

Figure 6:
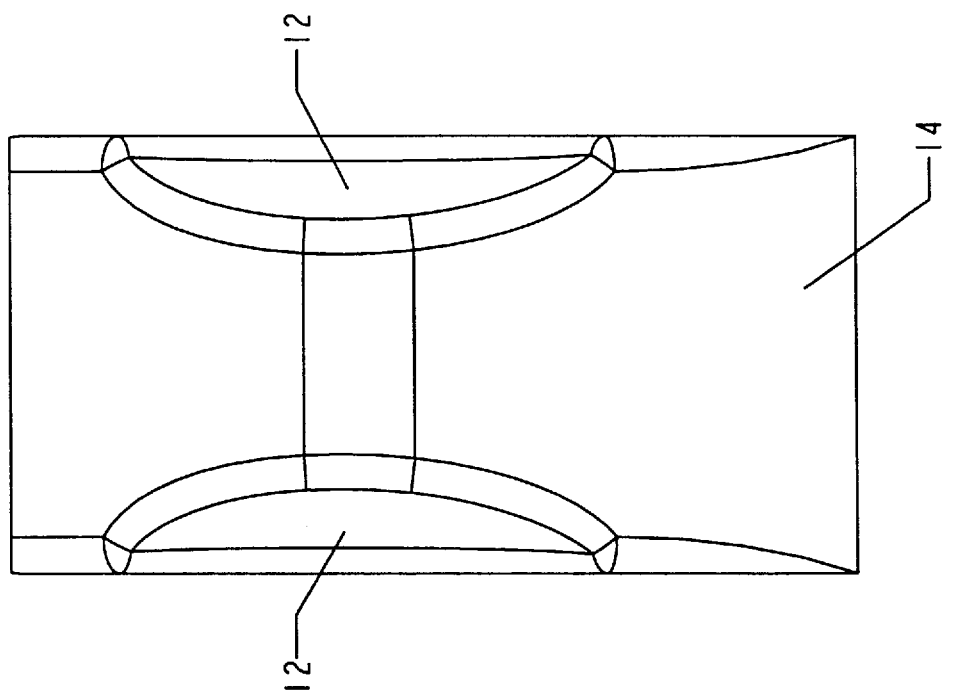
FIG. 6 shows a top view of a palm and forearm support device.
Figure 7:
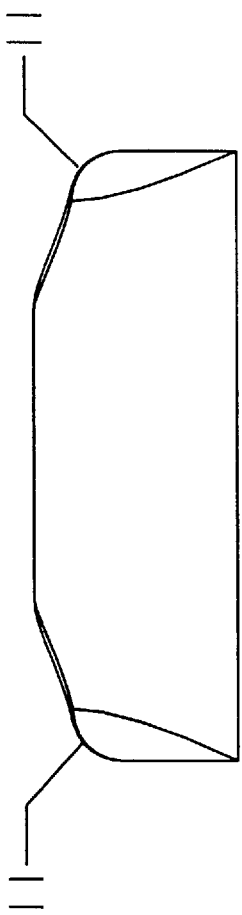
FIG. 7 shows a rear view of a palm and forearm support device.
Figure 10:
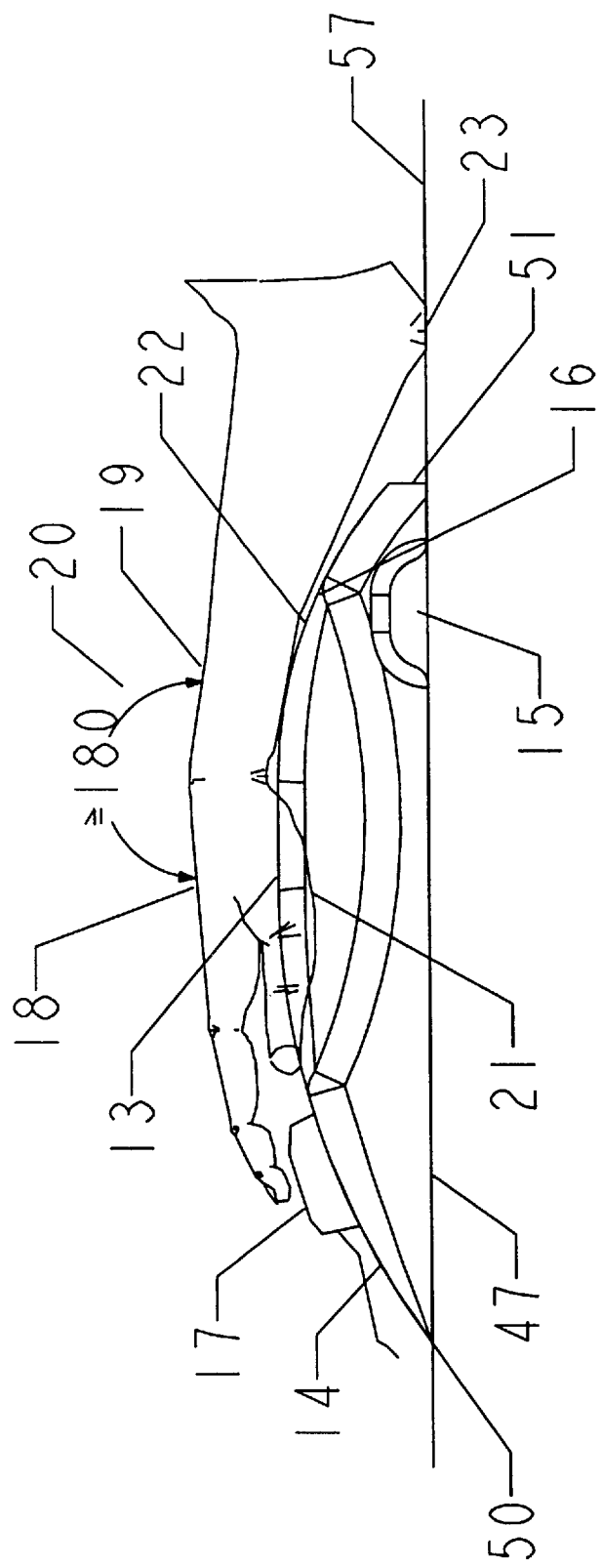
FIG. 10 shows a side view of a palm and forearm support device with a user's hand, forearm, and cursor control (mouse).

Palm and forearm support 46 has recessed thumb portions 12, shown in FIG. 6 and FIG. 9, such that user's thumb appendage can rest inside as shown in FIG. 10 number 21. All edges of palm and forearm support 46 having large radii 11 with radii blending together at all edges such that no rough or sharp edges are exposed to the user's hand 18 and forearm 19.

So as not to limit the size of the radius of edges, one may consider for the purposes of illustration, that the radii could be comparable to the radii found on the skin surface of the human hand(example: 0.5 to 1 inch).

FIG. 10 shows palm and forearm support 46 having raised central palm support 13, above base 47. The level to which central palm support 13 is raised, as depicted, is for the purposes of illustration only and may be of any level. This level should be limited only in that raised central palm portion 13 is above base 47 such that an angle of greater than or equal to 180 degrees is created between the top of the user's hand 18, and the top of the user's forearm 19. This angle to be created with user's elbow 23 on same surface as that of base 47, with the user's palm resting upon the raised central palm portion 13 and user's forearm resting upon convex inclined forearm support 16.

Figure 8:
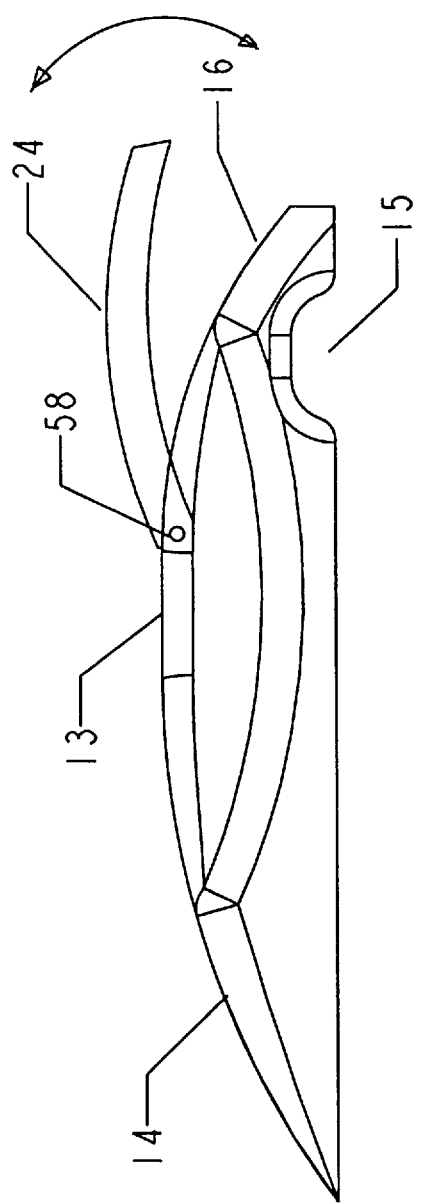
FIG. 8 shows a side view of a palm and forearm support device with adjustable forearm support.

FIG. 8 shows a side view of palm and forearm support 46 having a convex declined cursor position control surface 14. Surface 14 is at a declined angle from raised central palm support 13, sloping from the raised plane created by central palm portion 13 down toward the base 47, ending at the front edge 50. The convex shape of surface 14 is intended to enhance the performance of cursor position control devices such as a mouse 17 by creating a tangency between the mouse 17 and surface 14. This improves over existing cursor control surfaces because existing cursor control surfaces are flat and deviances in flatness or smoothness lose the tracker ball contact inside the mouse causing bad connections between the tracker ball and motion sensors or the like commonly found in cursor position control devices.

Depicted in FIG. 8 and FIG. 10 is a convex inclined forearm support 16. Convex inclined forearm support 16 begins at or near base 47 and is inclined toward central palm support 13 moving away from rear 51, toward front 50, ending at the plane created by central palm support 13. The angle of inclination depicted is for the purposes of illustration only and may be of any angle. This angle should be limited only in that raised central palm portion 13 is above base 47 such that an angle of greater than or equal to 180 degrees is created between the top of the user's hand 18, and the top of the user's forearm 19. This angle to be created with user's elbow 23 on same surface as that of base 47 with the user's palm resting upon the raised central palm portion 13 and user's forearm resting upon convex inclined forearm support 16. Not shown are additional possible embodiments of convex inclined forearm support 16 including but not limited to a concavity or convexity in the transverse plane to that generated by convex inclined forearm support 16. Other possible embodiments not shown could further enhance the user's comfort.

FIG. 8 also shows an adjustable forearm support 24 which is attached to palm and forearm support 46 by hinge 58. This representation of adjustable forearm support 24 is merely to capture the idea of adjustability and does not limit the means of adjustment to those here mentioned. The particulars of installing hinge 58 as means of attachment for forearm support 24 to palm and forearm support 46 are well known to those with skill in the art and are not shown in detail.

FIG. 8 shows grab handles 15 which are located forward of rear 51. Grab handles 15 having a central axis perpendicular to rear 51. The location or shape or other variation not mentioned of grab handles 15 is not to be limited and are shown here for the purposes of illustration only. Grab handles 15 could be rendered as recessed finger holds, or protrusions for grasping. Grab handles 15 improve over the current art in that current devices of similar nature do not have grab handles 15 at all and it is therefore difficult to move these devices around on working surface 57. Grab handles 15 would enable the user to conveniently relocate palm and forearm support 46 upon working surface 57 by inserting fingers into grab handles 15.

DESCRIPTION OF USE OF PALM AND FOREARM SUPPORT 46

FIG. 10 shows palm and forearm support 46 is used by placing palm and forearm support 46 upon working surface 57 having base 47 adjacent to working surface 57. Rear 51 disposed close to the user, with front 50 being furthest from the user. The location of palm and forearm support 46 should be such that the palm of the hand can be comfortably placed in a prone position upon palm support 13, and the forearm can be comfortably placed upon convex inclined forearm support 16. The thumb of the hand is to be laid over raised palm portion 13 and into thumb recess 12, laying fingers over cursor position control device 17.

By placing the elbow upon the working surface 57, the user's arm is now comfortably supported by working surface 57, raised palm support 13, convex inclined forearm support 16, and partially by cursor position control device 17. Convex declined surface 14 allows the hand and forearm to be arranged such that an angle of greater than or equal to 180 degrees is created between the top of the user's hand 18, and the top of the user's forearm 19. Convex declined surface 14 allows the fingers to conveniently move the cursor control device 17 toward the user by pulling upon the cursor control device 17 toward the palm of the hand in a natural grasping motion. Natural prehensile or grasping motion is thus attained. When the user wants to move the cursor control 17 away from the user, gravity assists in this translation and reduces the amount of force required to move the cursor control 17 away from the user. Typical cursor control devices 17 cause force by the hand in a direction that is not prehensile or grasping, and by reducing the amount of force to move the cursor control 17 away from the user, this force is kept to a minimum without power assist. Transverse motion is attained by moving the cursor control 17 from side to side with the fingers.

The palm of the hand, in conjunction with the bottom side of the forearm have a much larger weight bearing surface than the wrist, and when draped over palm support 13, and resting upon convex inclined forearm support 16, there is relatively little tension in or pressure upon the hand ligaments and joints. By supporting the palm of the hand and the bottom side of the forearm, rather than the wrist, Repetitive Strain Injuries can be significantly reduced, especially in the wrist and thumb joints.

FIG. 8 shows adjustable forearm support 24 is used by raising or lowering forearm support 24 to the most user desired location pivoting about hinge 58.

FIG. 8 shows grab handles 15 which are used by inserting fingers into grab handles 15 and pulling or pushing etc. to relocate palm and forearm support 46. Grab handles 15 add convenience to the use of palm and forearm support 46.

Personally, I suffer from Repetitive Strain Injuries and have used my palm and forearm support device for many months. My employment requires me to extensively use, every day, a mouse type cursor control, and my palm and forearm support device has greatly helped my condition. If I do not use my palm and forearm support device, I begin to feel the effects of repetitive strain within only a matter of hours.

Reference FIGS. 24–27 FIG. 24 shows a perspective view of lap mounted cursor position control pad 71. FIG. 25 shows control pad 71 having recessed leg portion 69 opposite forearm support 70. Adjacent to forearm support 70 is convex declined cursor control surface 68. Convex declined cursor control surface 68 acts both as control surface and user palm support. FIG. 26 shows cursor control surface forming front 73 with rear 72 opposite.

FIG. 27 shows cursor pad 71 which when used creates an angle of greater than or equal to 180 degrees between the top of the user's hand 74 and the top of the user's forearm 75 when using cursor position control(mouse) 77.

Cursor control pad 71 is used by placing cursor control pad 71 into the lap as show in FIG. 24. The user can then use the mouse 77 while maintaining an angle of greater than or equal to 180 degrees between the top of the hand 74 and the top of the forearm 75 with all the benefits mentioned in previous description above.

FIG. 28 shows a perspective view of a possible use of ergonomic interface 79 as data entry method for aircraft pilot 78 of aircraft 80. Ergonomic interface 79 could contain associated electronics and controls etc. required to pilot aircraft 80, the particulars of which are known to those with skill in the art and are not included in detail.

Figure 29:
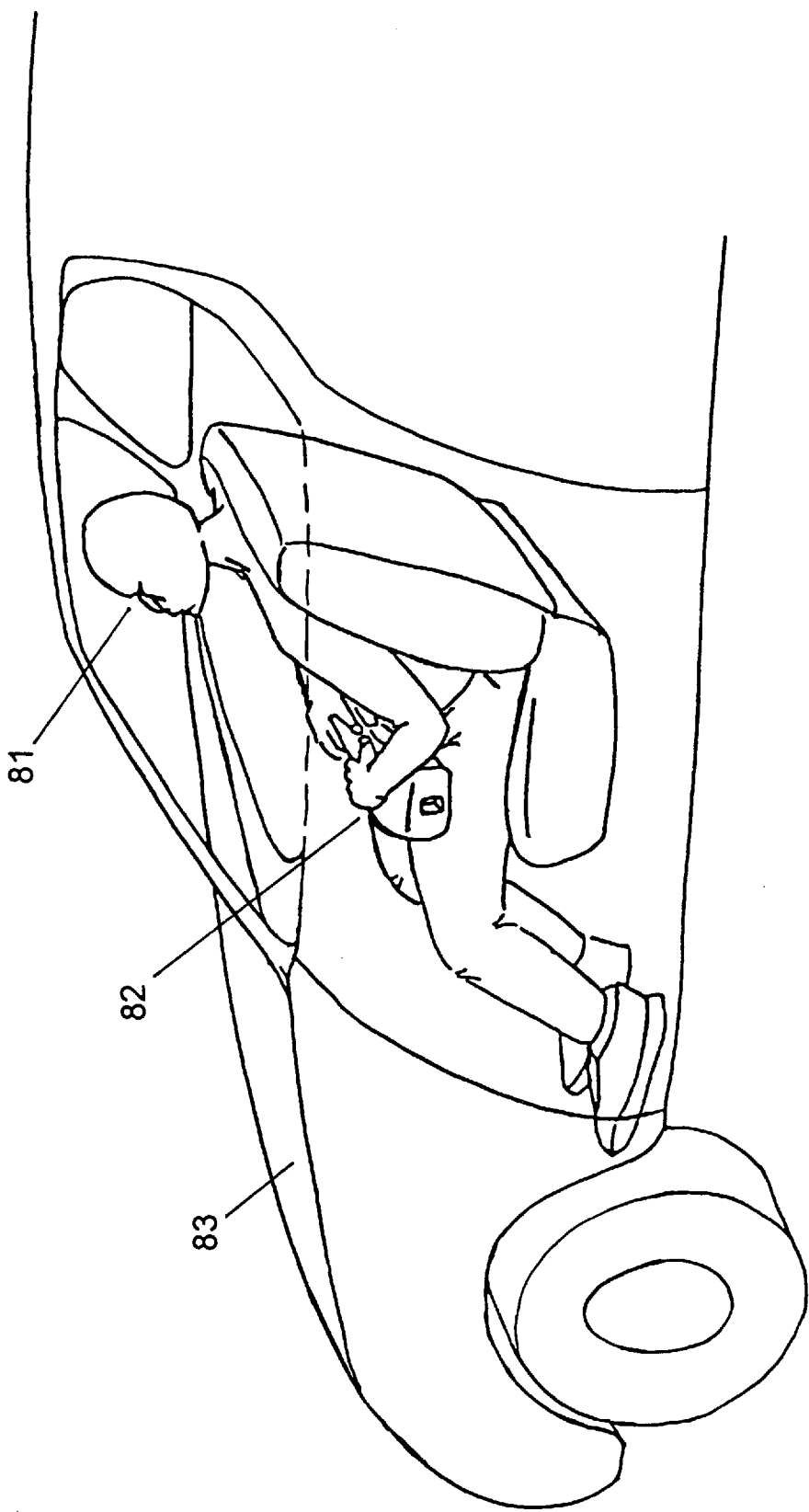
FIG. 29 shows a perspective view of an automobile driver using a keyboard having palm and forearm support in the lap mounted position.

FIG. 29 shows a perspective view of a possible use of ergonomic interface 82 as data entry method for automobile driver 81 of automobile 83. Ergonomic interface 82 could contain associated electronics and controls etc. required to drive an automobile 83, the particulars of which are known to those with skill in the art and are not included in detail.

Figure 30:
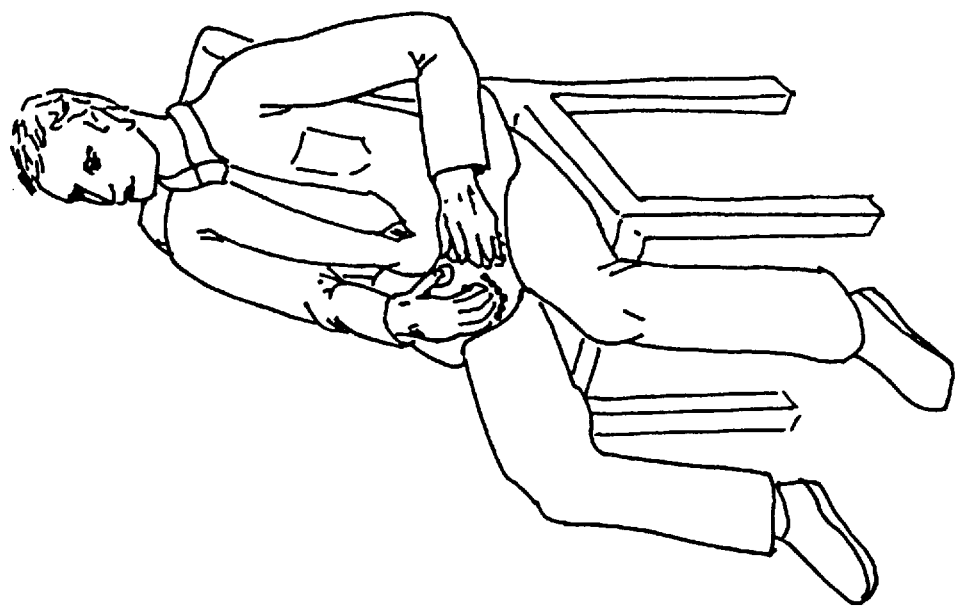
FIG. 30 shows a perspective view of a user with a keyboard having palm and forearm support in the lap mounted position.

FIG. 30 shows a perspective view of a computer keyboard 52 user with computer keyboard 52 in user's lap clearly depicting palms and forearms in support.

Figure 31:
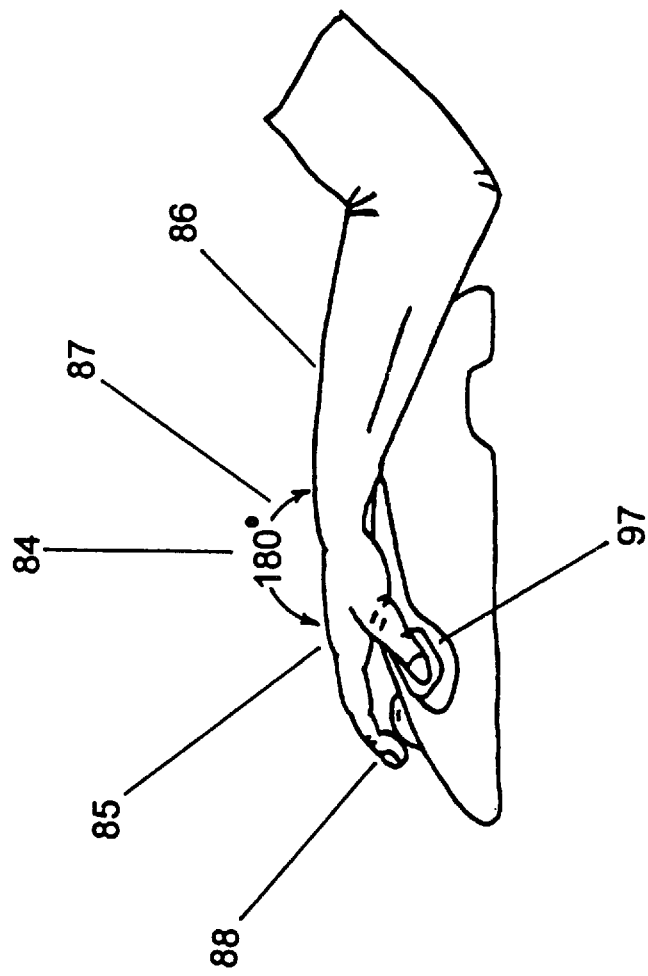
FIG. 31 shows a side view of a cursor control device (mouse) having palm and forearm support with recessed thumb portions and generally illustrating the angle of greater than or equal to 180 degrees between the top of the hand and the top of the forearm of the user.

FIG. 31 shows a side view cursor position control device 84 with all characteristics of previously described palm and forearm support 46(FIGS. 6–10), the difference being an additional cursor position control device 88 and recessed "pick buttons" 97. The particulars of the associated electronics etc. for the control device 88 and "pick buttons" 97 are well known to those with skill in the art and are not shown in detail. Cursor position control device is used in the same way as palm and forearm support 46 except that the fingers directly manipulate cursor position control 88. While using cursor position control device 84, an angle of greater than or equal to 180 degrees is maintained between the top of the hand 85 and the top of the forearm 86. Cursor control 84 also includes functionality for left or right handed persons.

Figure 32:
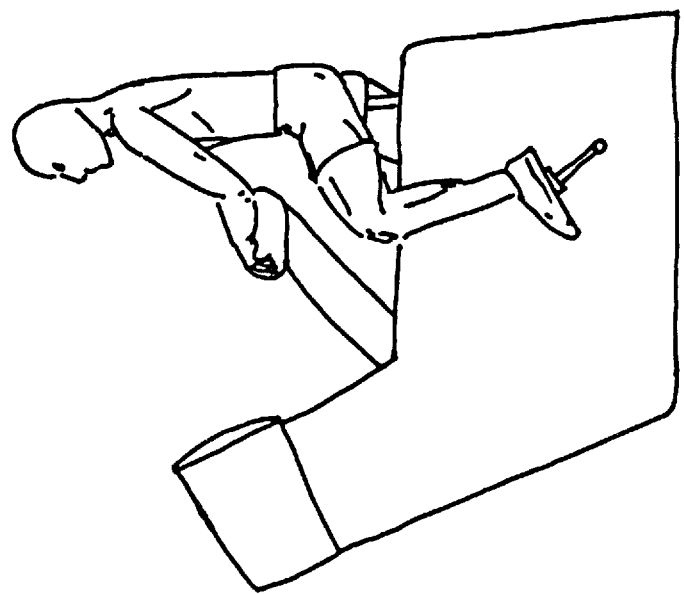
FIG. 32 shows a side view of an athlete making use of a keyboard having palm and forearm support for use as an interactive exercise machine data entry device.

FIG. 32 shows a side view of a possible use of ergonomic interface 91 as data entry method for athletic equipment 92. Athlete 89 resting palms and forearm upon ergonomic interface 91 while viewing cathode ray tube 90 or the like. This embodiment could be used in the athletic industry which is experiencing rapid growth in the area of "interactive exercise equipment" or the like. Ergonomic interface 91 includes all characteristics of computer keyboard 52 of FIGS. 11–23, 33, and 34.

SUMMARY, RAMIFICATIONS, AND SCOPE

According to the invention, the ergonomic interface addresses the issues of Repetitive Strain Injury, and the general discomfort associated with the use of manually actuated data entry devices such as, computer keyboards, cursor position control devices(mouse) and the like. The ergonomic interface provides a convenient, practical and simple solution which is easy to manufacture with existing technology.

While the above description contains many specificities, these should not be construed as limitations on the scope of the invention, but rather as an exemplification of several preferred embodiments thereof. Many other variations of the invention are possible. For example, the shape of the device could be split at its central plane creating two halves forming armrests of a chair, control pads for the transportation industry, machinery control for the agriculture industry, or the like. Other variations could include interfaces for video games, televisions, teller machines, motorcycles, and so on to include any device requiring a manually actuated data entry interface for humans.

The invention could be manufactured from virtually any material, color, or texture within the constrains of the appended claims.

Accordingly, the scope of the invention should be determined not by the embodiments illustrated, but by the appended claims and their legal equivalents.

I claim:

1. A forearm support and mousepad device for supporting the forearm of a user's arm during the user's operation of a computer mouse, the device comprising:
    (a) a forearm support portion for supporting the user's forearm; and
    (b) a mousepad portion defining a cursor position control surface adjacent the forearm support portion such that when the device is positioned for use, the control surface is generally declined and a computer mouse can be positioned on the mousepad portion adjacent the palm of the user's hand when the user's forearm is positioned on the forearm support portion;
whereby when a mouse is positioned on the mousepad portion adjacent the palm of the user's hand, an angle of greater than or equal to 180 degrees is created between the top of the user's hand and the top of the user's forearm, and a natural grasping motion is used to control the mouse.

2. A forearm support and mousepad device according to claim 1, wherein the control surface has a generally convex surface contour when observed from above the control surface, whereby a tangency is created between the control surface and a mouse positioned on the control surface.

3. A forearm support and mousepad device according to claim 1, further comprising a base having a recessed leg portion formed in the bottom thereof for positioning and supporting the device on the user's leg.

4. A forearm support and mousepad device according to claim 3, wherein the forearm support defines a recessed portion for the user's forearm.

5. A forearm support and mousepad device according to claim 3, wherein the mousepad supports the user's palm through a mouse positioned on the control surface.

6. A forearm support and mousepad device according to claim 1, further comprising a base having a substantially planar bottom surface for positioning and supporting the device on a working surface.

7. A forearm support and mousepad device according to claim 6, wherein a palm support portion is located between the forearm support portion and the mousepad portion.

8. A forearm support and mousepad device according to claim 6, further comprising a thumb recess adjacent the side of the palm support portion.

9. A forearm support and mousepad device according to claim 6, further comprising first and second thumb recesses on opposite sides of the palm support portion to accommodate the thumb position of either a right-handed or a left-handed user.

10. A forearm support and mousepad device according to claim 6, further comprising grab handles.

11. A forearm support and mousepad device according to claim 10, wherein the grab handles comprise recessed finger holds in the base.

12. A forearm support and mousepad device according to claim 6, further comprising a hinge for adjusting the inclined position of the forearm support portion relative to the base.

13. A forearm support and mousepad device according to claim 1, wherein the edges of the forearm support portion have radii in the range of about 0.5 inch to about 1 inch.

14. A forearm support and mousepad device according to claim 1, in combination with a computer mouse located/positioned on the mousepad portion.

15. A palm and forearm support device for supporting the palm and the forearm of a user's hand and arm during the user's operation of a computer cursor control device, the device comprising:
    (a) a base having a forward end and a rearward end;
    (b) a raised palm support portion between the forward end and the rearward end of the base;
    (c) a forearm support portion that is inclined from the rearward end of the base toward the raised palm support portion, whereby, when the user's palm and forearm are placed on the device, an angle of greater than or equal to 180 degrees is created between the top of the user's hand and the top of the user's forearm; and
    (d) a cursor position control surface portion that is declined from the raised palm support portion toward the forward end of the base;
    (e) a cursor position control device located/positioned on the control surface;
    (f) a thumb recess adjacent the side of the palm support portion; and
    (g) a cursor pick button in the thumb recess.

16. A palm and forearm support device according to claim 15, wherein the base has a substantially planar bottom surface for positioning and supporting the device on a working surface.

17. A palm and forearm support device according to claim 15, wherein the base has a recessed leg portion formed in the bottom thereof for positioning and supporting the device on the user's leg.

18. A palm and forearm support device according to claim 15, wherein the palm support portion is centrally located on the base.

19. A palm and forearm support device according to claim 15, wherein the forearm support portion has a generally convex surface contour when observed from above the device.

20. A palm and forearm support device according to claim 15, further comprising a hinge for adjusting the inclined position of the forearm support portion relative to the base.

21. A palm and forearm support device according to claim 15, wherein the cursor position control surface portion has a generally convex surface contour when observed from above the device.

22. A palm and forearm support device according to claim 21, wherein the cursor position control device comprises a mouse.

23. A palm and forearm support device according to claim 21, wherein the cursor position control device comprises a track ball.

24. A palm and forearm support device according to claim 15, further comprising a second thumb recess on the opposite side of the palm support portion whereby the device is able to accommodate the thumb position of either a right-handed or a left-handed user.

25. A palm an forearm support device according to claim 15, wherein the edges of the palm and forearm support portions have radii in the range of about 0.5 inch to about 1 inch.

26. A palm and forearm support device according to claim 15, further comprising grab handles.

27. A palm and forearm support device according to claim 26, wherein the grab handles comprise recessed finger holds in the base.

28. A palm and forearm support device for supporting the palm and the forearm of a user's hand and arm during the user's operation of a data entry interface, the device comprising:

(a) a base having a forward end and a rearward end;

(b) a raised palm support portion between the forward end and the rearward end of the base;

(c) a forearm support portion that is inclined from the rearward end of the base toward the raised palm support portion, whereby, when the user's palm and forearm are placed on the device, an angle of greater than or equal to 180 degrees is created between the top of the user's hand and the top of the user's forearm;

(d) a keyboard surface portion that is generally declined from the raised palm support portion toward the forward end of the base and has a convex surface contour when observed from above the device; and (e) a plurality of manually actuated data entry mechanisms located on the keyboard surface portion, wherein each of the data entry mechanisms is actuated by pressing in a direction normal to the keyboard surface portion;

wherein the device is generally V shaped having both right and left hand portions for supporting both the right and left hands and forearm of the user and wherein the keyboard surface portion is declined and convex following a general V shape from a left end to a center and from a right end to the center forming one continuous convex declined surface.

* * * * *